(12) United States Patent
Monroe et al.

(10) Patent No.: US 9,652,423 B2
(45) Date of Patent: May 16, 2017

(54) CAN AND FLEXIBLE DATA RATE CAN NODE APPARATUS AND METHODS FOR MIXED BUS CAN FD COMMUNICATIONS

(71) Applicant: Texas Instruments Incorporated, Dallas, TX (US)

(72) Inventors: Scott A. Monroe, Frisco, TX (US); David W. Stout, Lewisville, TX (US); John P. Griffith, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 317 days.

(21) Appl. No.: 14/255,984

(22) Filed: Apr. 18, 2014

(65) Prior Publication Data

US 2014/0365693 A1   Dec. 11, 2014

Related U.S. Application Data

(60) Provisional application No. 61/831,494, filed on Jun. 5, 2013, provisional application No. 61/872,437, filed on Aug. 30, 2013, provisional application No. 61/924,851, filed on Jan. 8, 2014.

(51) Int. Cl.
| | |
|---|---|
| *G06F 3/00* | (2006.01) |
| *G06F 13/42* | (2006.01) |
| *G06F 13/38* | (2006.01) |
| *H04L 12/40* | (2006.01) |
| *H04L 12/933* | (2013.01) |
| *H04L 29/06* | (2006.01) |

(52) U.S. Cl.
CPC .............. *G06F 13/385* (2013.01); *G06F 3/00* (2013.01); *G06F 13/42* (2013.01); *H04L 12/40032* (2013.01); *H04L 49/102* (2013.01); *H04L 69/18* (2013.01); *H04L 2012/40215* (2013.01)

(58) Field of Classification Search
USPC ...... 710/11, 105, 106, 305; 714/39; 370/470
See application file for complete search history.

(56) References Cited

U.S. PATENT DOCUMENTS

| | | | |
|---|---|---|---|
| 5,734,658 A | 3/1998 | Rall et al. | |
| 2004/0153870 A1* | 8/2004 | Konz et al. | 714/47 |
| 2013/0094353 A1 | 4/2013 | Monroe et al. | |
| 2013/0294460 A1* | 11/2013 | Hell | 370/470 |
| 2014/0129748 A1* | 5/2014 | Muth | 710/106 |

(Continued)

OTHER PUBLICATIONS

Kumar, "An Introduction to CAN", Control Area Network (CAN) Tutorial—ElectroSofts.com, retrieved from the Internet Mar. 5, 2014, http://electrosofts.com/can/, 7 pgs.

(Continued)

*Primary Examiner* — Khanh Dang
(74) *Attorney, Agent, or Firm* — Andrew Viger; Charles A. Brill; Frank D. Cimino

(57) ABSTRACT

Controller area network (CAN) communications apparatus and methods are presented for CAN flexible data rate (CAN FD) communications in a mixed CAN network with CAN FD nodes and one or more non-FD CAN nodes in which a CAN FD node wishing to transmit CAN FD frames sends a first predefined message requesting the non-FD CAN nodes to disable their transmitters before transmitting the CAN FD frames, and thereafter sends a second predefined message or a predefined signal to return the non-FD CAN nodes to normal operation.

20 Claims, 19 Drawing Sheets

(56) References Cited

U.S. PATENT DOCUMENTS

2014/0215109 A1\* 7/2014 Hopfner ............... 710/105
2014/0330996 A1\* 11/2014 de Haas ............... 710/106
2015/0339254 A1\* 11/2015 Hartwich ............. 710/106

OTHER PUBLICATIONS

Richards, "A CAN Physical Layer Discussion", AN228, Microchip, Microchip Technology Inc., AN228, DS00228A, 2002, 12 pgs.

Texas Instruments, "'Turbo' CAN Transceivers for Higher Data Rates and Large Networks Including Features for Functional Safety", SN65HVD255, SN65HVD256, SN65HVD257; SLLSEA2C, Dec. 2011, Revised Sep. 2013, 27 pgs.

Bosch, "CAN with Flexible Data-Rate", Specification, Version 1.0, Apr. 17, 2012, 34 pgs.

Bosch, "CAN with Flexible Data-Rate", White Paper, Version 1.1, 2011, 16 pgs.

\* cited by examiner

CAN AND FLEXIBLE DATA RATE CAN NODE APPARATUS AND METHODS FOR MIXED BUS CAN FD COMMUNICATIONS

This application claims priority to and the benefit of the following U.S. Provisional Patent Applications: Provisional Patent Application Ser. No. 61/831,494 that was filed on Jun. 5, 2013 and is entitled METHODS FOR MIXED CAN AND CAN WITH FLEXIBLE DATA RATE (CAN FD OR IMPROVED CAN) IN THE SAME NETWORK; Provisional Patent Application Ser. No. 61/872,437 that was filed Aug. 30, 2013 and is entitled SOLUTIONS OF CAN AND CAN FD IN A MIXED NETWORK TOPOLOGY; and, Provisional Patent Application Ser. No. 61/924,851 that was filed Jan. 8, 2014 and is entitled SOLUTIONS OF CAN AND CAN FD IN A MIXED NETWORK TOPOLOGY, the entireties of which applications are incorporated by reference herein.

FIELD OF THE INVENTION

The present disclosure relates to controller area network (CAN) communications apparatus and more particularly to apparatus and techniques to facilitate flexible data rate controller area network (CAN FD) communications in a mixed network having both non-FD CAN nodes and CAN FD nodes.

BACKGROUND

CAN is a serial communications protocol for distributed real time control with bitrates up to 1 Mbit/s for applications from high speed industrial networks and automotive electronics using low cost multiplex wiring. CAN protocols and specifications including ISO 11898 have been widely adopted for communication among devices, commonly referred to as CAN nodes, where the CAN standard ISO11898-1 defined the CAN data link layer and ISO11898-2 and ISO11898-5 CAN standards describe CAN high-speed medium access units or physical layer components (e.g., transceivers), and ISO11898-6 refers to another physical layer (PHY) standard. The ISO standards ISO11898-1, ISO11898-2, ISO11898-5 and ISO11898-6 are incorporated herein by reference. CAN nodes typically include a CAN-compatible transceiver connected to a microcontroller (MCU) or digital signal processor (DSP), with the transceiver providing physical layer interconnection to a two-wire CAN bus. The CAN protocol defines the data link layer and part of the physical layer of the OSI model. CAN FD (CAN with Flexible Data-Rate, or flexible data rate CAN) has been proposed for higher data rates, in which CAN FD protocol controllers can implement standard CAN communication as well as flexible data-rate operation. CAN nodes implementing control units or CAN controllers based on the original ISO11898-1 CAN protocol are referred to as non-FD CAN nodes, and nodes having a control unit that uses the proposed CAN with Flexible Data Rate protocol are referred to herein as CAN FD nodes. CAN FD nodes may operate using the original CAN protocol and thus may be added to existing CAN network installations. However, the CAN FD protocol is not directly interoperable with the original CAN protocol, where non-FD CAN nodes receiving CAN FD communications will interpret the CAN FD frame as an error and potentially generate an error frame, thereby corrupting the communications on the mixed network. ISO11898-6 with extensions proposes a complicated solution using CAN with selective wake up in which conventional CAN transceivers are put into a low power mode and then awoken following FD communications, but this approach involves significant latency in resuming CAN communication. In particular, extensions and proposals suggest adding additional logic to the transceiver described by ISO11898-6 to make it smarter to detect an FD frame in a special mode and ignore it, thus preventing bus error generation or the message getting through to the normal CAN node. Thus, while mixed networks including both CAN FD nodes and non-FD CAN nodes are possible and desirable, these mixed networks cannot easily take advantage of the enhancements associated with CAN FD protocols. Improved apparatus and methods are therefore needed to mix CAN FD and non-FD CAN nodes in the same network and allow the CAN FD capable systems to communicate with the advanced features and data rates of CAN FD while ensuring the non-FD CAN nodes will not corrupt the data during the CAN FD transmissions.

SUMMARY

The present disclosure provides techniques and apparatus for mixed CAN FD and non-FD CAN transmissions and nodes in a single network.

A CAN FD communications node apparatus is provided, including a processor and a transceiver operative to transmit and receive CAN and CAN FD frames via a mixed CAN network. For CAN FD transmission, the processor uses the transceiver to transmit a first predefined message or a first predefined signal to the mixed CAN network requesting one or more non-FD CAN nodes to disable their transmitter, and then the CAN FD node transmits one or more CAN FD frames to the mixed CAN network. Following CAN FD frame transmission, the CAN FD node processor transmits a second predefined message or a second predefined signal to the network to request the non-FD CAN nodes to re-enable their transmitters.

In certain embodiments, the CAN FD processor causes the transceiver to transmit a third predefined message requesting the non-FD CAN nodes to reset their error counters prior to transmitting the second predefined message. In this manner, if a first threshold number of CAN FD frames were transmitted, the non-FD nodes will clear internal error counters before their transmitters are re-enabled for protocols providing for reset or error counter clear messaging. In alternate implementations, the CAN FD node transmits a sufficient number of additional CAN frames to clear error counters of the non-FD CAN nodes prior to transmitting the second predefined message. These implementations advantageously allow use of pre-existing transceivers in CAN FD nodes with the node processors implementing software or firmware to accommodate the transmission of the first and second predefined messages.

In certain embodiments, the transceiver operates for normal transmission using first and second CAN bus states, and the CAN FD node includes auxiliary transmit circuitry operable to selectively transmit the second predefined message or the second predefined signal using a third bus state distinguishable from the first and second bus states in order to request the non-FD CAN nodes enable their transmitters. The auxiliary transmit circuit and the transceiver may be separate or may be provided in a single integrated circuit in various embodiments.

Further aspects of the disclosure provide a non-FD CAN communications node apparatus, which includes a transceiver with a transmitter and a receiver, as well as a processor configured to disable the transmitter in response to receipt of a first predefined message or a first predefined signal, and to enable the transmitter in response to receipt of a second predefined message or a second predefined signal. In certain embodiments, the transmitter is disabled by the processor providing a mode control signal to a mode select input of the transceiver in a first state to place the transceiver into a silent mode in response to receipt of the first predefined message or the first predefined signal, and the transmitter is enabled by providing the mode control signal in a second state in response to receipt of the second predefined message or the second predefined signal. In this manner, the non-FD CAN nodes can employ pre-existing transceivers which are placed into the silent mode during transmission of FD frames, and the node can be quickly brought back into normal operation via non-FD CAN node processor software or firmware without the extra latency associated with returning from a low power mode.

In other embodiments, the non-FD CAN node includes an auxiliary receiver circuit operative to receive and identify the second predefined message by detecting a third bus state, as well as a mode control circuit operable by the processor to selectively disable the transmitter in response to receipt of the first predefined message or the first predefined signal and to enable the transmitter in response to receipt by the auxiliary receiver circuit of the second predefined message or the second predefined signal. In certain embodiments, moreover, the auxiliary receiver circuit, the mode control circuit, and the transceiver are provided in a single integrated circuit.

Additional aspects of the present disclosure provide a non-FD CAN communications node apparatus, including a transceiver with a transmitter and a receiver, a processor, an auxiliary receiver circuit operative to distinguish three different bus states, and a mode control circuit which disables the transmitter in response to receipt by the auxiliary receiver circuit of a first predefined message, and to enable the transmitter in response to receipt by the auxiliary receiver circuit of a second predefined message. This apparatus advantageously facilitates operation without modification of the non-FD CAN node processor software or firmware for expeditious disabling and subsequent re-enabling of the transmitter to facilitate flexible data rate communication on a mixed network.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
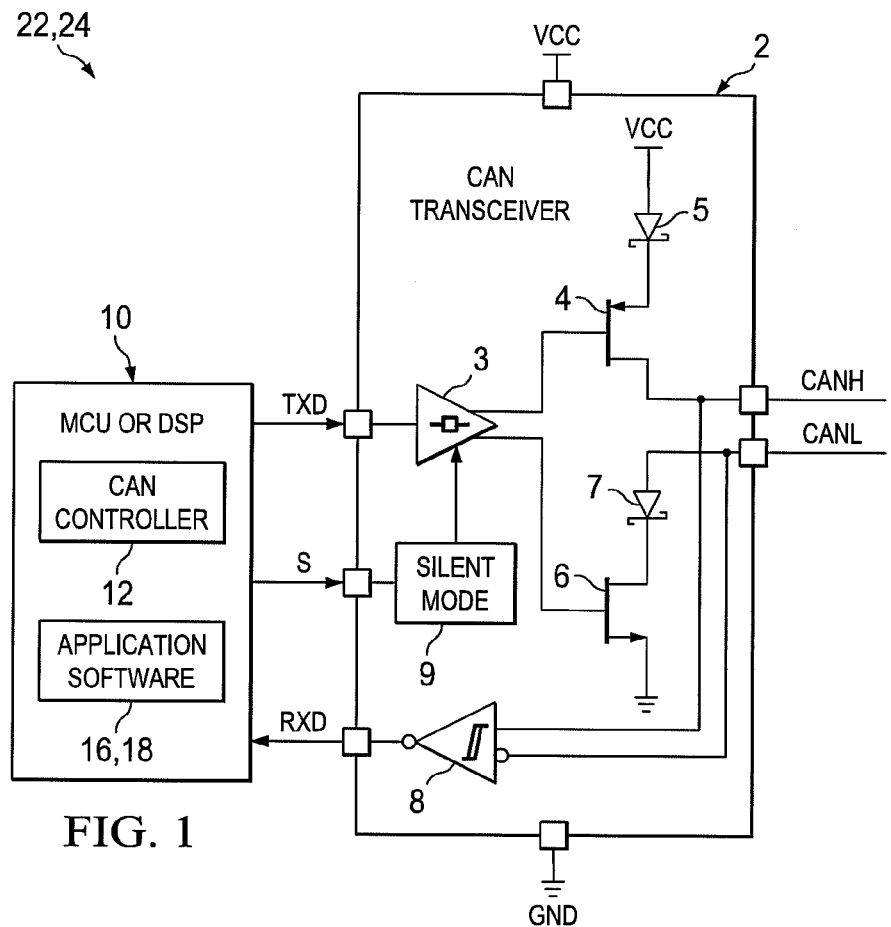
FIG. 1 is a schematic diagram illustrating an exemplary node including a processor and a CAN transceiver for interfacing with a CAN bus according to one embodiment.

One or more embodiments or implementations are hereinafter described in conjunction with the drawings, wherein like reference numerals are used for reference to like elements throughout, and wherein the various features are not necessarily drawn to scale.

Referring initially to FIGS. 1-5, certain embodiments of the present disclosure provide advantageous use of a transceiver silent mode in conjunction with application level software 16 and 18 for CAN FD nodes 24 and non-FD CAN nodes 22 implementing predefined messaging for mode transition. Using these techniques, a CAN FD node 24 can selectively instruct non-FD CAN nodes 22 on a mixed bus to temporarily disable their transmitters 3 prior to transmission of flexible data rate frames, after which the CAN FD node 24 instructs the non-FD CAN nodes 22 to then re-enable their transmitter circuits 3. The selective use of silent mode operation in certain implementations advantageously employs pre-existing CAN transceiver circuitry 2 and may be implemented in certain cases by simple software/firmware updates to the CAN FD nodes 24 and the non-FD CAN nodes 22 of a mixed network installation.

FIG. 1 illustrates an exemplary CAN node 22, 24 in accordance with various embodiments, including a transceiver 2 which can be implemented in certain cases as a single integrated circuit device operatively coupled with one or more processors (10), for example, a microcontroller (MCU), digital signal processor (DSP), or other suitable processing circuitry including without limitation general-purpose microprocessors, programmable logic, or the like. Suitable CAN transceivers 2 include SN65HVD255, SN65HVD256 and SN65HVD257 transceiver products from Texas Instruments Incorporated or the like. The transceiver 2 has first and second network connections CANL and CANH for interconnection with other CAN nodes (e.g., with CAN FD nodes 24 and non-FD CAN nodes 22 in a mixed network application has seen in FIG. 3 below). The transceiver 2 of FIG. 1 includes a transmitter 3 receiving a signal from a TXD pin of the processor 10 and providing a first differential output to drive a PMOS transistor 4 with a source connected through a Schottky diode 5 to a positive supply voltage VCC and a drain providing a transmit output to the second (CANH) network connection. The transmitter 3 also provides a second differential output to drive an NMOS transistor 6 with a source connected to a circuit ground (GND) and a drain connected through another Schottky diode 7 to the first network connection CANL. As further shown in FIG. 1, moreover, the transceiver 2 includes a receiver 8, in this case comprising a differential comparator with an output connected to a receive (RXD) pin of the processor 10. The transceiver 2 in FIG. 1 further includes a mode control circuit 9 operative according to a control signal from the processor 10 to a "silent mode" transceiver input pin (S) to cause the transceiver 2 to operate in either a normal mode or a silent mode with the transmitter 3 disabled.

The processor 10 includes, or is programmed via, program instructions to implement a CAN controller 12 and operates according to application software or firmware 16, 18. The application software 16, 18 in the embodiments of FIGS. 1-5 is configured to accommodate first and second predefined messages to allow a CAN FD node 24 to selectively request non-FD CAN nodes 22 on a mixed network to selectively enable and disable their associated transmitters 3 to prevent generation of error frames by non-FD CAN nodes 22 during transmission of FD frames. In the illustrated implementations of the corresponding non-FD CAN nodes 22 and CAN FD nodes 24, moreover, mixed network operation utilizing selective FD communications can be achieved without hardware modification, thereby allowing use of pre-existing transceivers 2 with simple software/firmware upgrades to the various nodes 22, 24. In addition, the nodes 22, 24 in the examples of FIGS. 1-5 can implement selective FD communication in a mixed network 20 with far less latency than would be the case were the non-FD CAN nodes placed into a low power mode during FD communications and reawakened following transmission of the FD frames as proposed in ISO11898-6 with extensions.

Figure 2:
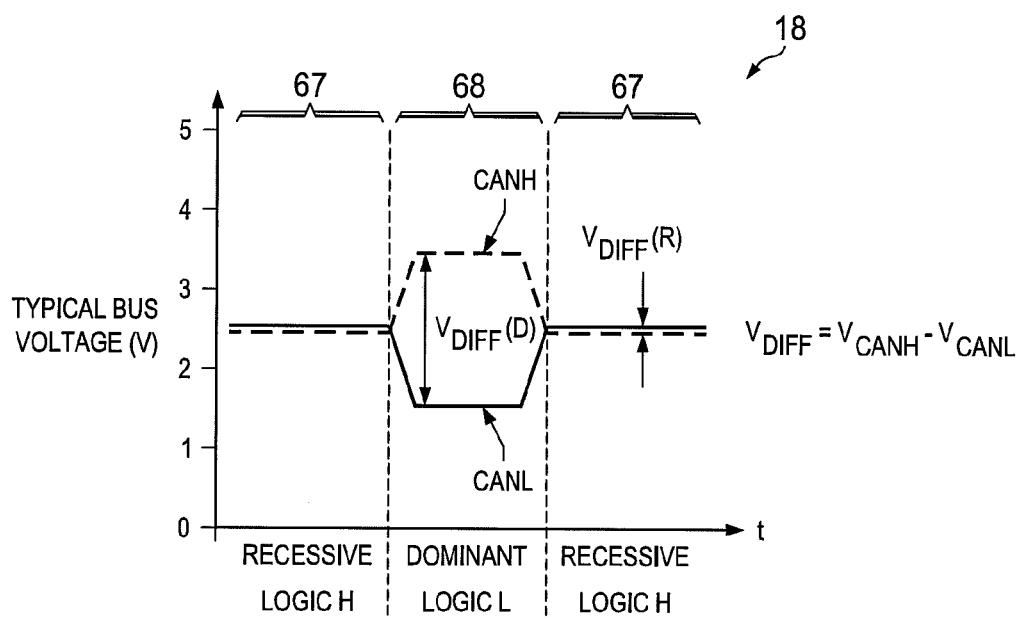
FIG. 2 is a graph illustrating bus communications signaling using a logic high recessive state and a logic low dominant state for communications with the CAN node of FIG. 1.

As seen in FIG. 2, the CAN bus is weakly biased to approximately half the supply voltage (VCC/2) and the transceiver 2 transmits and receives CAN frames and CAN FD frames using a first bus state 67 in which the network connections CANL and CANH are not actively driven by the transceiver 2. This recessive state (logic high in the illustrated embodiment) is illustrated in a graph 18 in FIG. 2 for a 5 V supply voltage (e.g., VCC=5 V), with a voltage difference $V_{diff}(R)$ being less than a first non-zero threshold value for logic high message bits. The normal communications on the CAN bus also includes a dominant second bus state 68 (logic low) in which a positive voltage $V_{diff}(D)$ between CANH and CANL is greater than the first threshold value. In normal operation, the transmitter 3 of a transmitting node 22, 24 does not actively drive the bus lines CANL, CANH during the recessive first bus state 67, and actively drives the bus lines CANL, CANH during the second dominant bus state 68, with the receivers 8 operating according to corresponding threshold values to distinguish the first and second states 67 and 68 in order to receive messaging from the bus lines and provide a corresponding bit stream via the RXD pin to the associated processor 10. As shown, the CANL voltage may be somewhat higher than that of the CANH bus line in the recessive state 67, although the corresponding recessive voltage difference $V_{diff}(R)$ is generally near zero due to the weak biasing of the bus lines CANL and CANH.

Figure 3:
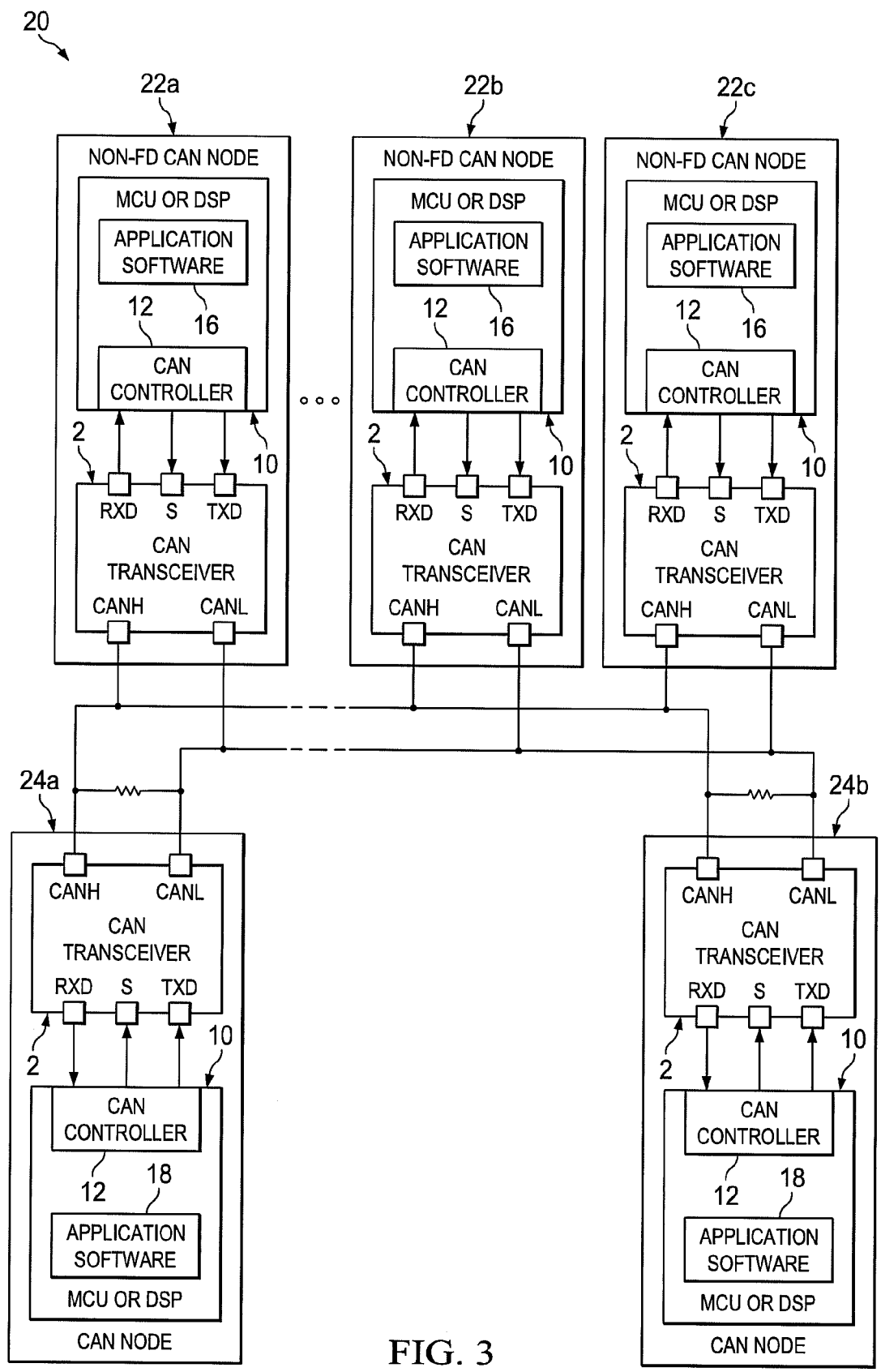
FIG. 3 is a schematic diagram illustrating a mixed CAN bus system with flexible data rate CAN (CAN FD) nodes and non-FD CAN nodes.

FIG. 3 illustrates an exemplary mixed CAN network 20 including a number of non-FD CAN nodes 22 as well as CAN FD nodes 24. FIG. 3 illustrates three exemplary non-FD CAN nodes 22a, 22b and 22c, although any positive integer number of non-FD CAN nodes 22 may be connected in such a mixed network 20. Similarly, two exemplary CAN FD nodes 24a and 24b are shown in FIG. 3, although other mixed network implementations are possible having two or more CAN FD nodes 24. As seen in FIG. 3, moreover, the non-FD CAN nodes 22 include at least one processor 10 implementing a CAN controller 12 as well as application software 16 operative to provide communication functions as are known as well as processing for received predefined first and second messages as further described below. Also, the CAN FD nodes 24 include one or more processors 10 implementing a CAN controller 12 as well as application software 18 providing both normal and FD CAN communications functions including selective transmission of first and second predefined messages as discussed further below.

Figure 4:
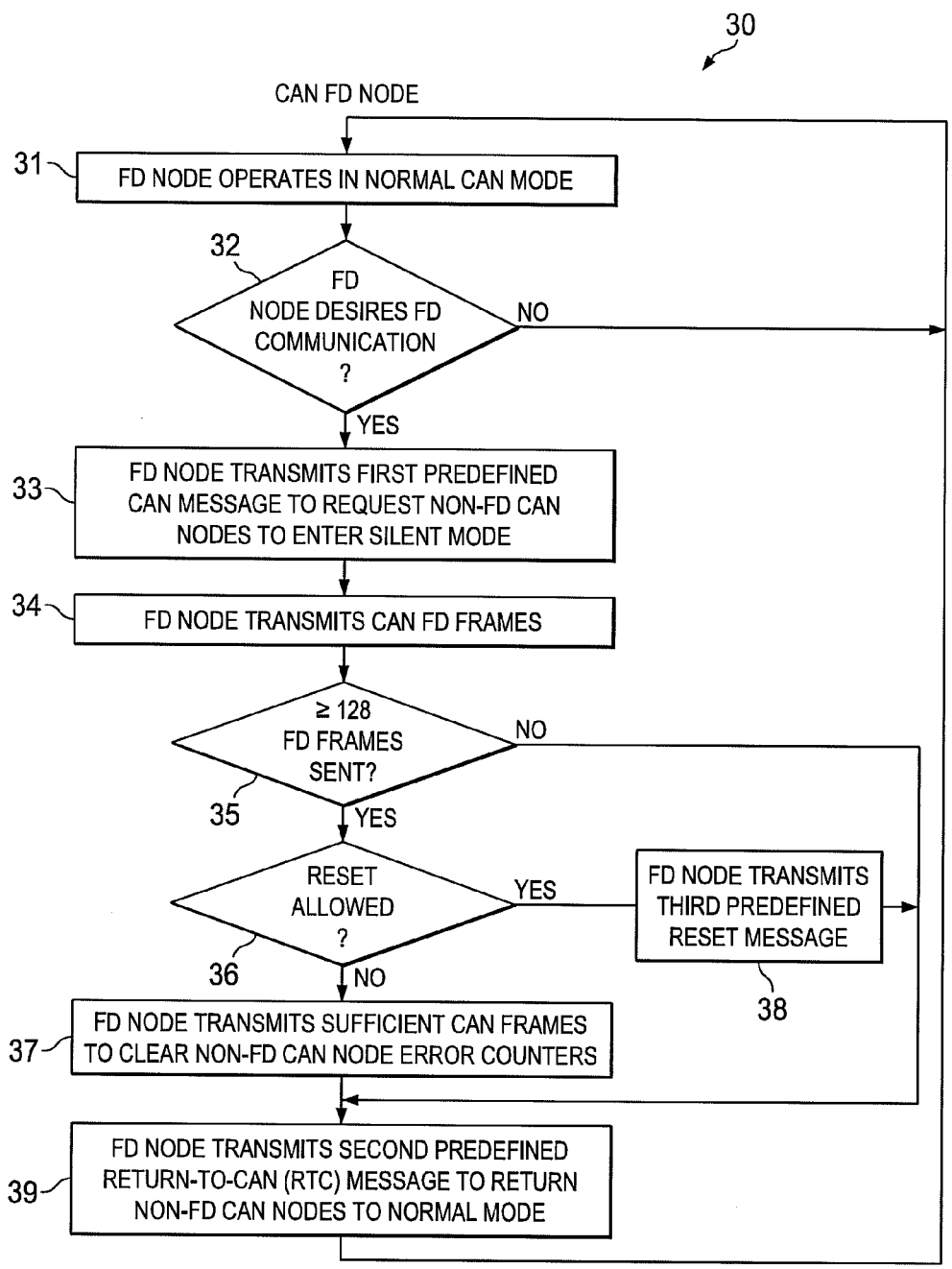
FIG. 4 is a flow diagram illustrating operation of a CAN FD node in the system of FIG. 3 according to a first embodiment.
Figure 5:
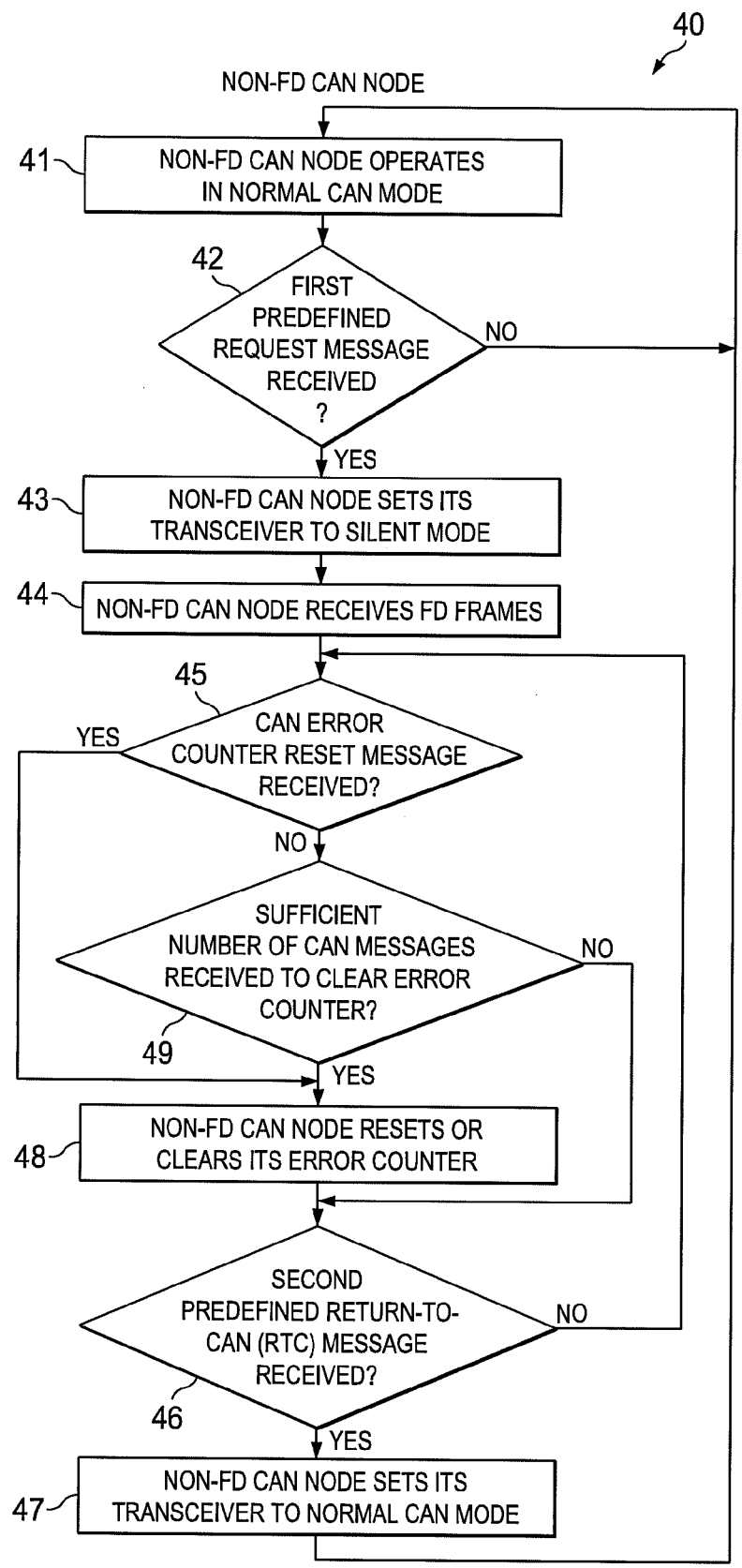
FIG. 5 is a flow diagram illustrating operation of a non-CAN node in the system of FIG. 3 according to the first embodiment.

Referring also to FIGS. 4 and 5, a process or method 30 in FIG. 4 illustrates operation of the exemplary CAN FD nodes 24 for selective FD frame transmission, and the method 40 in FIG. 5 depicts operation of the exemplary non-FD CAN nodes 22 in the mixed network 20 of FIG. 3. Although the methods 30 and 40 and other processes of the present disclosure are illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods, moreover, may be implemented in hardware, processor-executed software, processor-executed firmware or combinations thereof, such as in the exemplary processors 10 and/or circuitry of the respective CAN FD and non-FD CAN nodes 24 and 22 described herein, and may be embodied in the form of non-transitory computer executable instructions stored in a computer readable medium in certain embodiments, such as in an electronic memory operatively associated with the node processors 10.

In the embodiments of FIGS. 1-5, application software or firmware 16 and 18 in the nodes 22 and 24, respectively provides for request messaging initiated by the CAN FD nodes 24 to cause the non-FD CAN nodes 22 to utilize transceiver silent mode operation in a selective fashion to facilitate communication via FD frames between the CAN FD nodes 24 without disrupting operation of the mixed network 20. In this regard, certain CAN transceivers 2 (e.g., FIG. 1 above) offer a silent mode that disables the transmitter driver circuitry 3, but may leave the receiver circuitry 8 active, thereby allowing non-FD CAN node 22 to listen to or monitor the bus CANL, CANH. The embodiments of FIGS. 1-5 advantageously employ this silent mode operation for the non-FD CAN nodes 22 to allow transmission of FD frames while preventing the non-FD CAN nodes 22 from transmitting or otherwise disrupting the communication flow on the bus since the driver 3 is disabled making the unit silent or mute. These embodiments thus provide a simple method of mixing CAN FD nodes 24 with non-FD CAN nodes 22 primarily in software utilizing this feature of existing CAN transceivers 2. These concepts can therefore be easily applied to systems where the bus may be dedicated to CAN FD message traffic for long periods of time, such as for a software update, or where a very short burst of CAN FD traffic is desired.

The process 30 for a CAN FD node 24 begins at 31 in FIG. 4, with the CAN FD node 24 operating in a normal CAN mode. A determination is made at 32 as to whether the FD node 24 desires FD communication, for example, to send high-speed data to another CAN FD node 24 in the network 20. If not (NO at 32), the CAN FD node 24 continues in normal CAN mode operation at 31. Once FD communication is desired (YES at 32), the CAN FD node transmits a first predefined message at 33 in FIG. 4 to request the non-FD CAN nodes 22 to enter the silent mode, thereby disabling their respective transmitters 3.

As seen in the process 40 of FIG. 5, the non-FD CAN nodes 22 operate in normal mode at 41, and determine at 42 whether a first predefined request message has been received. If not (NO at 42), the non-FD CAN node operation continues in normal fashion at 41. Once the first predefined request message has been received (YES at 42 in FIG. 5), the non-FD CAN node 22 sets its transceiver 2 to the silent mode or otherwise disables operation of its transmitter 3 at 43 in FIG. 5. In the illustrated example, for instance, upon receipt of the first predefined message via the receiver 8 and the RXD pin (FIG. 1), the processor 10 of the non-FD CAN node 22 asserts the "S" pin of its transceiver 2, thereby activating the mode control circuit 9 to disable operation of the associated transmitter circuit 3. In this manner, the application software 18, 16 of the CAN FD node 24 and the non-FD CAN nodes 22 selectively employ the silent mode of the non-FD CAN node transceiver 2 to prevent the nodes 22 from corrupting bus traffic during CAN FD communication.

Any suitable first predefined message can be used, and such messages may be sent to specific non-FD CAN nodes 22 or may be a single broadcast message sent to all nodes 22, 24 in the network 20. In one simple implementation, for example, the CAN FD node 24 which desires to send FD frames broadcasts the first predefined message at 33 in FIG. 4 to request the non-FD CAN nodes 22 to enter the silent mode, and then transmits the FD frames at 34. As seen in the example of FIG. 5, these FD frames are received at 44 by the non-FD CAN nodes 20, but the disabled transmitters 3 of the non-FD CAN nodes 22 will not transmit any error messages as a result. Instead, the non-FD CAN nodes 22 await receipt of a second predefined message (Return-To-CAN (RTC) message) at 46 before re-enabling their respective transmitters at 47.

In certain implementations the CAN FD node 24 tracks the number of FD frames transmitted at 35, and if the number of FD frames does not exceed a threshold (e.g., 128 FD frames in the example of FIG. 4), the CAN FD node 24 presumes that the error counters of the non-FD CAN nodes 22 are not in overflow (NO at 35 in FIG. 4), and transmits a second predefined message (RTC message) at 39 to return the non-FD CAN nodes 22 to normal mode operation, thereby re-enabling their transmitters 3. For this operation, the non-FD node 22 monitors for receipt of error counter reset messaging at 45 or CAN messages at 49 or receipt of an RTC message at 46, and returns to 45 if no RTC message is received (NO at 46). Once the CAN FD node 24 transmits an RTC message at 39, the CAN FD node process 30 of FIG. 4 returns to normal operation at 31 as described above. Otherwise, if the number of FD frames exceeds the threshold (YES at 35 in FIG. 4), the CAN FD node 24 determines at 36 whether reset messaging is permitted in the given mixed network system 20, and if so (YES at 36) transmits a third predefined "reset" or "clear" message at 38 in order to request the non-FD CAN node(s) 22 to reset its/their error counter(s) prior to transmitting the second predefined message at 39 via the transceiver. As seen in FIG. 5, the non-FD CAN node 22 in this case determines at 45 whether a CAN error counter reset or clear message has been received, and if so (YES at 45) will reset its error counter at 48 and then await receipt of the second predefined (RTC) message at 46.

If reset messages are not permitted or recognized (NO at 36 in FIG. 4), the CAN FD node 24 in certain embodiments transmits a sufficient number of CAN frames at 37 in order to clear the non-FD CAN node error counters, and then transmits the second predefined (RTC) message at 39. As seen in the example of FIG. 5, if no clear or reset messages received (NO at 45), the receipt of a sufficient number of CAN frames (YES at 49) will cause the error counter of the non-FD CAN node 22 to be reset at 48, after which the non-FD CAN node 22 awaits receipt of the second predetermined message at 46. In the illustrated implementations, the receipt of the second predefined message (YES at 46 in FIG. 5) causes the associated processor 10 of the non-FD CAN nodes 22 to change the state of the silent mode control signal provided to the "S" terminal of the transceiver 2, thereby placing the transceiver 2 back into the normal operating mode with the transmitter circuitry 3 thereof enabled. Thereafter, the non-FD CAN nodes 22 can resume CAN mode operation along with the CAN FD nodes 24 in the mixed bus or mixed network system 20 of FIG. 3.

In operation, the non-FD CAN nodes 22 and the CAN FD nodes 24 in the system 20 according to the embodiments of FIGS. 1-5 thus permit selective transition of the non-FD CAN nodes 22 into the silent mode via the corresponding application software 16 upon request by operation of the application software 18 of one of the CAN FD nodes 24 wishing to initiate FD communications. Embodiments of these concepts of the present disclosure may advantageously be implemented in certain cases without any modification to pre-existing transceiver circuitry 2 in the CAN FD nodes 24 or in the non-FD CAN nodes 22. Use of the silent mode operation of the non-FD CAN nodes 22, moreover, advantageously prevents error frames from being generated by the non-FD CAN nodes 22 during FD communication, since the transmit drivers 3 (e.g., and possibly the corresponding transceivers 2) are disabled or turned off in the silent mode. In this state, the CAN FD nodes 24 can freely transmit any number of FD frames without bus corruption, and certain embodiments may provide for selective clearing or resetting of error counters in the non-FD CAN nodes 22, as needed, prior to re-enabling the non-FD node transmitters 3 via transmission of the second predetermined message. In this manner, the operation of the CAN FD nodes 24 advantageously ensures that the non-FD nodes 22 will not corrupt communication in the mixed network 20, either during FD transmission, or following re-enablement of the non-FD CAN node transmitters 3.

The CAN FD node apparatus 24 in the examples of FIGS. 1-5 thus uses the processor 10 to cause the transceiver 2 to transmit the first predefined message to the mixed CAN network 20 at 33 requesting the non-FD CAN node(s) 22 to disable its/their transmitter(s) 3 before FD transmission at 34, and then uses the FD node transmitter 3 to transmit the second predefined message at 39 so as to request the non-FD nodes 22 to enable their transmitters 3. The processors 10 in the non-FD nodes 22, in turn, selectively disable the associated transmitter 3 (43 in FIG. 5) in response to receipt at 42 of the first predefined message, and then selectively enable the transmitter 3 at 47 in response to receipt of the second predefined message at 46. In certain embodiments, the approach of FIGS. 1-5 is facilitated by use of an available low power mode on the non-FD CAN node transceivers 2, although other techniques can be used by which the transmitter of the non-FD node 22 is selectively disabled based on receipt of the first predefined message and thereafter enabled in response to receipt of the second predefined message. In these embodiments, moreover, any suitable second predefined message can be used, which can be transmitted via the CAN bus lines CANL and CANH in certain implementations using only the two bus states 67 and 68 recognized in normal CAN bus operation as shown in FIG. 2.

Figure 6:
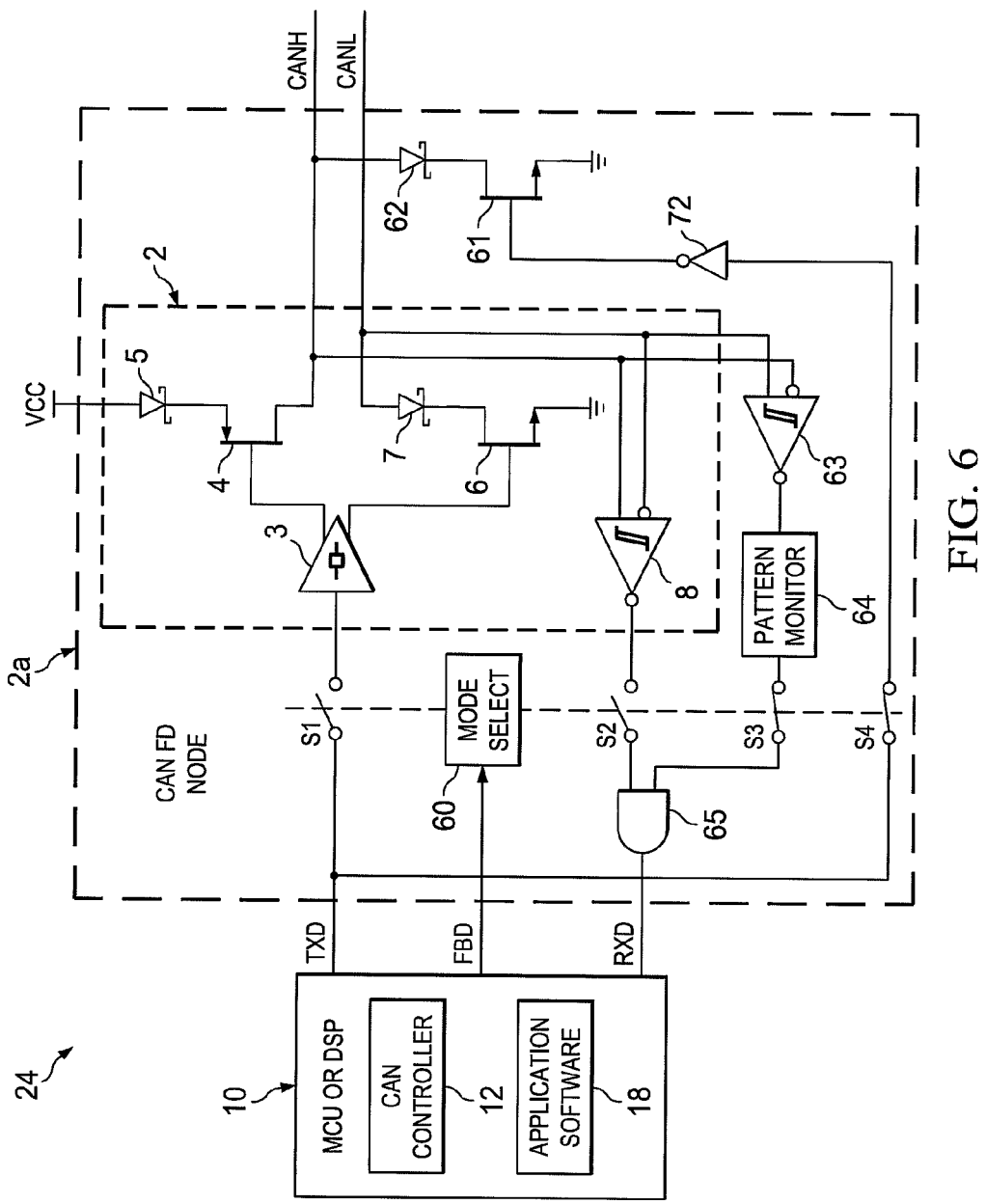
FIG. 6 is a schematic diagram illustrating an exemplary CAN FD node programmed to request CAN nodes to enter an FD blocking operating mode, and including auxiliary transmit circuitry for generating an inverted third CAN bus state to request CAN nodes to return to normal CAN operating mode according to further embodiments.

Referring now to FIGS. 6-14, further CAN FD nodes 24 and non-FD CAN nodes 22 and associated operating processes 80 and 90 are illustrated using a modified approach. In these examples, a first predefined message is again transmitted by the CAN FD node 24 to direct the non-FD CAN nodes 22 to selectively disable their associated transmitters 3, with the CAN FD node 24 thereafter transmitting one or more FD frames and requesting resumption of normal CAN operation by sending a predefined signal on the CAN bus lines CANL, CANH using auxiliary transmit circuitry to implement a third (e.g., reverse or inverse dominant) bus state. FIG. 6 illustrates an exemplary CAN FD node 24 in accordance with certain embodiments, including a transceiver 2 with a normal transmitter circuit 3-7 and a receiver circuit 8 as described above in connection with FIG. 1 above. In addition, the CAN FD node 24 in FIG. 6 includes a mode select circuit 60 operable according to a "FD Blanking" control signal (FDB) from the processor 10 to operate switches S1-S4 for selective operation in a first mode (normal CAN mode) with S1 and S2 closed and with S3 and S4 opened. In this state, the node 24 is able to transmit messages via the TXD pin of the processor 10 and to receive communications from the CAN bus via the RXD pin of the processor 10 using the conventional CAN protocols.

In addition, as seen in FIG. 6, the TXD pin from the processor 10 is also connected to an auxiliary transmit circuit 61, 62 through the switch S4, including a NMOS transistor 61 connected between the CANH line and the circuit ground, with a Schottky diode 62 connected between the CANH line and the drain of the transistor 61 and an inverter 72 driving the NMOS gate with an inverted signal from the TXD output of the processor 10. Unlike the two conventional bus states 67 and 68, the provision of the auxiliary transmit circuitry 61, 62 in FIG. 6 allows the processor 10 (when the switch S4 is closed by the mode control circuit 60) to selectively transmit the predefined signal using a third bus state 69 in which the auxiliary transmit circuit 61, 62 controls the voltage between CANH and CANL ($V_{diff}=V_{CANH}-V_{CANL}$) to a second opposite polarity and a level greater than a second non-zero threshold value to request the non-FD CAN node(s) 22 to re-enable its/their transmitter(s) 3. Any suitable auxiliary transmit circuitry can be used in various embodiments by which the CAN FD node 24 generates a third bus state 69 that is distinguishable from the first and second bus states 67, 68 by a suitable receiver circuit.

Figure 7:
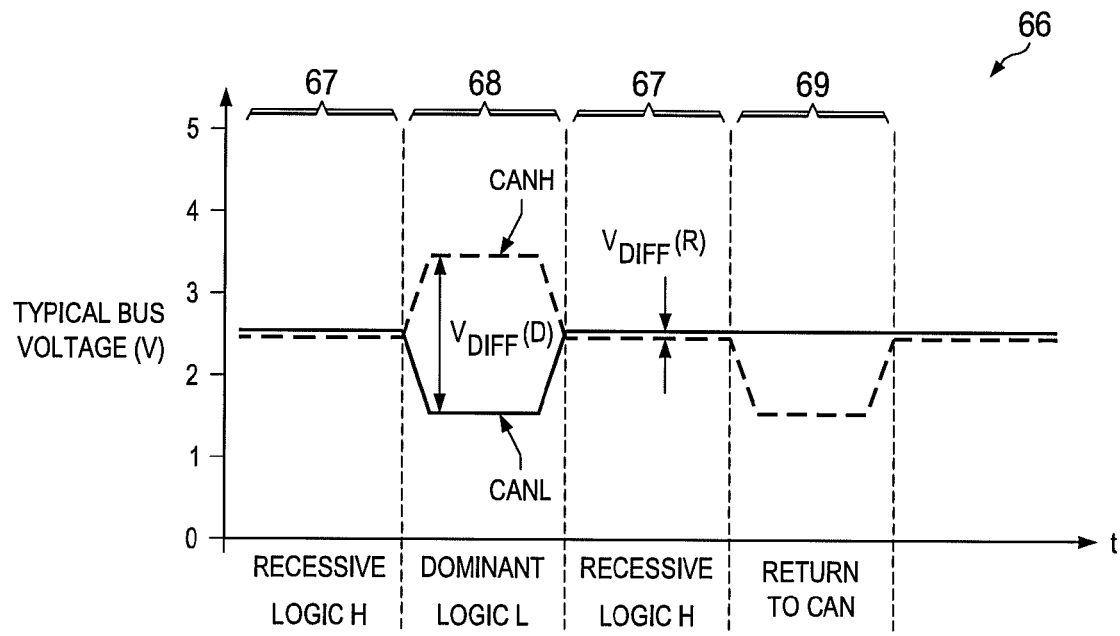
FIG. 7 is a graph illustrating modified CAN bus communications signaling including the inverted third CAN bus state generated by the CAN FD node of FIG. 6.

FIGS. 6 and 7 illustrate one non-limiting example in which the auxiliary transmit circuit 61, 62, 72 is actuated by control of the processor 10 (when S4 is closed) to pull the upper CAN line CANH toward the circuit ground, thereby providing the third state 69 shown in the graph 66 of FIG. 7 (Return to CAN signal), in which the reverse polarity voltage difference between the CANL and CANH bus lines is much greater than the recessive logic voltage difference $V_{diff}(r)$ of the first bus state 67. As described further below in connection with FIG. 12, the non-FD CAN node 22 in certain embodiments is equipped with an auxiliary receiver circuit having a comparator 63 which can identify the third bus state 69 generated by the CAN FD node 24 in this embodiment, and distinguish this from either or both of the first and second (normal) CAN bus states 67 and 68.

Figure 9:
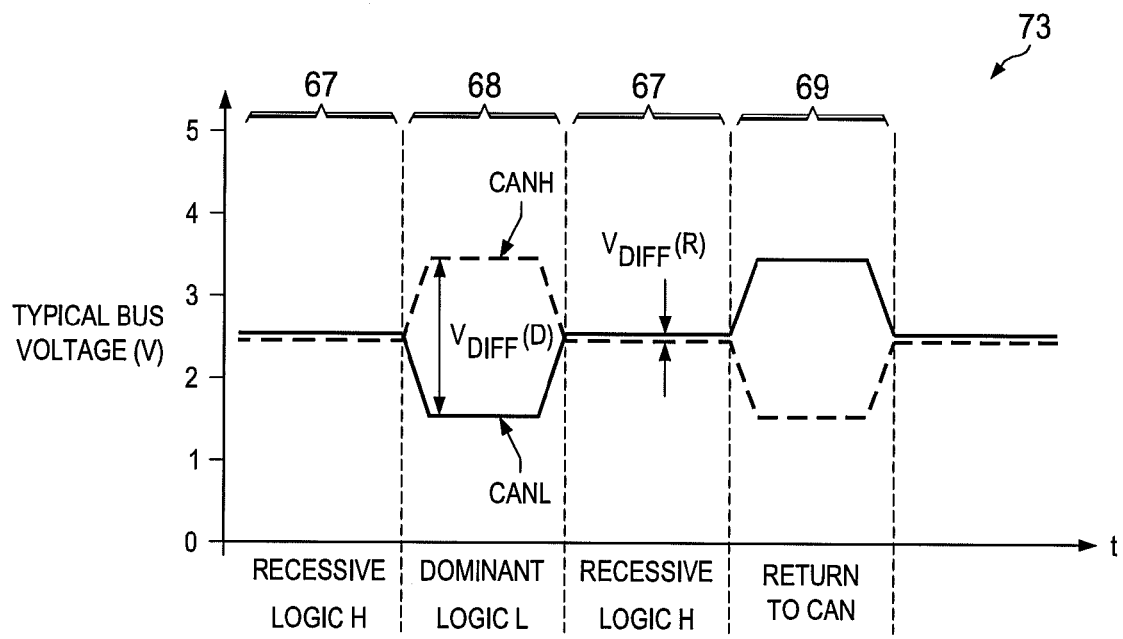
FIG. 9 is a graph illustrating modified CAN bus communications signaling including the inverted third CAN bus state generated by the CAN FD node of FIG. 8.
Figure 8:
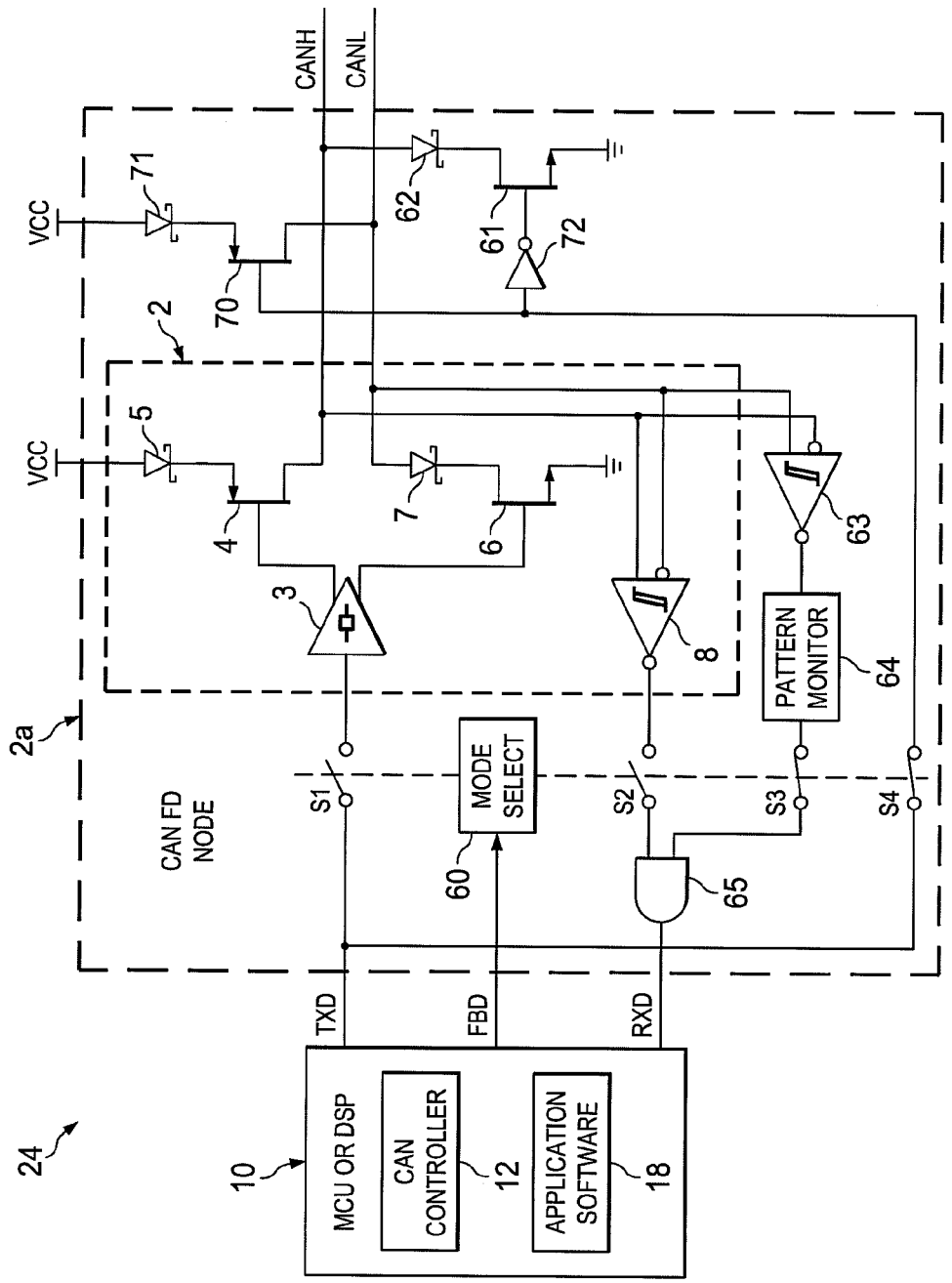
FIG. 8 is a schematic diagram illustrating another exemplary CAN FD node programmed to request CAN nodes to enter the FD blocking operating mode, with another embodiment of auxiliary transmit circuitry for generating an inverted third CAN bus state.

FIGS. 8 and 9 illustrate a second non-limiting CAN FD node example 24, similar to that of FIGS. 6 and 7, but with further auxiliary transmit circuitry 70-71 including a PMOS transistor 70 with a source connected through a second Schottky diode 71 to an upper supply voltage VCC, and with a drain connected to the lower CAN bus line CANL, where the gate of the transistor 61 is driven through an inverter 72 using the TXD line connection through S4 from the processor 10. As seen in the graph 73 of FIG. 9, the third state 69 in this example provides a larger reverse voltage than was the case in the example of FIGS. 6 and 7, thereby facilitating detection by a receiver circuit connected to the CAN bus lines CANL and CANH.

Figure 10:
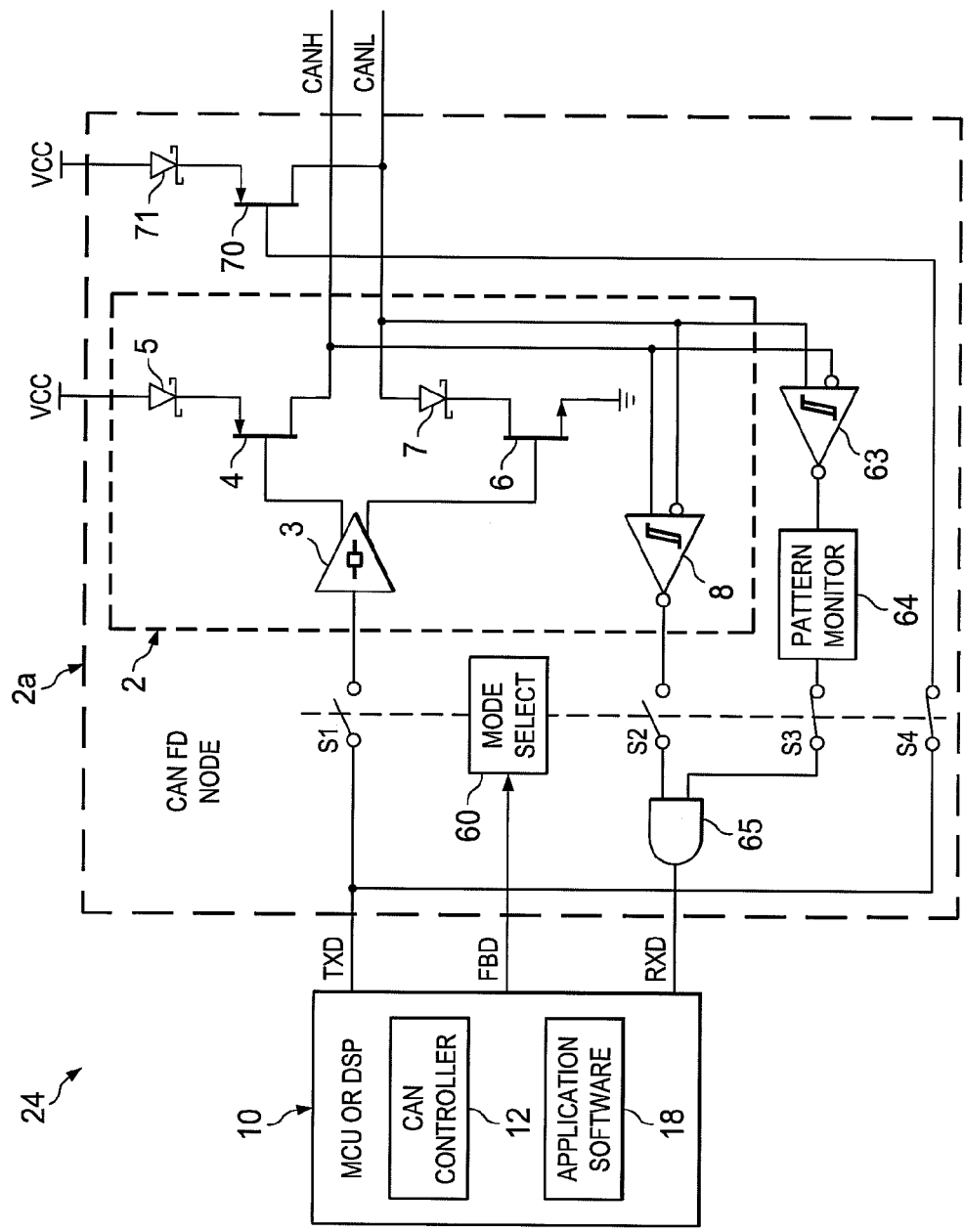
FIG. 10 is a schematic diagram illustrating yet another exemplary CAN FD node programmed to request CAN nodes to enter the FD blocking mode, including still another auxiliary transmit circuitry embodiment for generating an inverted third CAN bus state.
Figure 11:
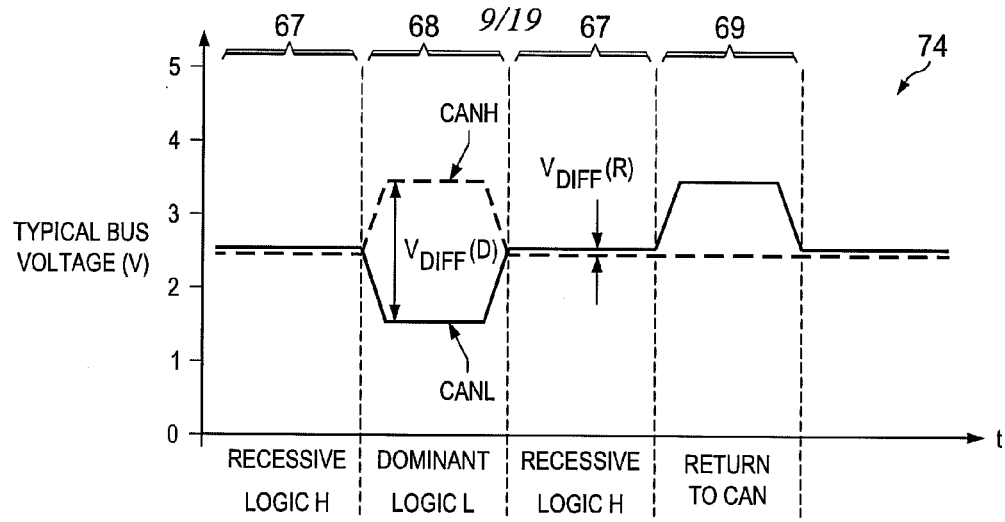
FIG. 11 is a graph illustrating another example of modified CAN bus communications signaling including the inverted third CAN bus state generated by the CAN FD node of FIG. 10.

Yet another non-limiting example is shown in FIGS. 10 and 11, in which the PMOS transistor 70 and Schottky diode 71 are provided to selectively raise the voltage at the lower CAN bus line CANL toward the upper supply voltage VCC. As seen in the graph 74 of FIG. 11, this implementation also provides a reverse polarity voltage signal of sufficient amplitude to allow receiver circuits to distinguish the third (inverse) bus state 69 from the first and/or second states 67 and 68.

As seen in FIGS. 6, 8 and 10, the CAN FD node embodiments 24 also provide the switch S1 connected between the TXD pin of the processor 10 and the input to the transceiver transmitter circuit 3, with the mode select circuit 60 opening S1 and closing S4 to implement the use of the third bus state 69 in sending a predefined signal to the bus lines CANL, CANH. Any suitable mode select circuitry 60 can be used by which one or more of the switches S1-S4 are selectively actuated under control of the associated node processor 10. Moreover, any suitable switching circuitry can be used to implement the illustrated switches S1-S4.

The CAN FD node 24 may further include auxiliary receiver circuitry 63-65 and switches S2 and S3 as shown in FIGS. 6, 8 and 10, although not a strict requirement of all implementations of this embodiment of the CAN FD node 24. If included, this auxiliary receiver circuitry, in combination with the switch control provided by the mode select circuitry 60, allows the transmitting CAN FD node 24 to monitor the bus for proper transmission of the predefined signal and/or the second predefined message using the third bus state. In the illustrated implementation, the auxiliary receiver circuitry includes a second receiver comparator circuit 63 operative to distinguish the third bus state 69, and the node 24 may further include a pattern monitor circuit 64 for identifying a particular pattern of the third bus state 69 in combination with one or more of the first and second states 67 and 68, where the pattern monitor circuit 64 may be omitted in certain CAN FD node embodiments. The output of the auxiliary receiver comparator circuit 63 is connected (directly or through any included pattern monitor circuit 64) to an input of an AND gate 65 whose output is connected to the RXD input pin of the processor 10, with the other gate input being connected through switch S2 to the output of the normal transceiver receiver circuit 8. In operation, the mode select circuit 60 closes S2 and opens S3 in normal operation, and opens S2 and closes S3 when the processor 10 provides the predefined signal to the non-FD CAN nodes 22 for blanking mode operation.

As seen in FIGS. 6, 8 and 10, moreover, the auxiliary transmit circuitry 61, 62, 72 and/or 70, 71 may be provided in addition to a conventional CAN transceiver integrated circuit 2, for example, on a printed circuit board including the transceiver IC 2. In certain embodiments, moreover, the auxiliary transmit circuit 61, 62, 72 and/or 70, 71 and the transceiver 2 (and/or any included auxiliary receiver circuitry and the mode select circuit 60) are provided in a single integrated circuit 2a. In this manner, such a single integrated circuit 2a may be used to replace a pre-existing transceiver circuit 2 by installation into circuit boards of existing CAN bus nodes 24.

Figure 13:
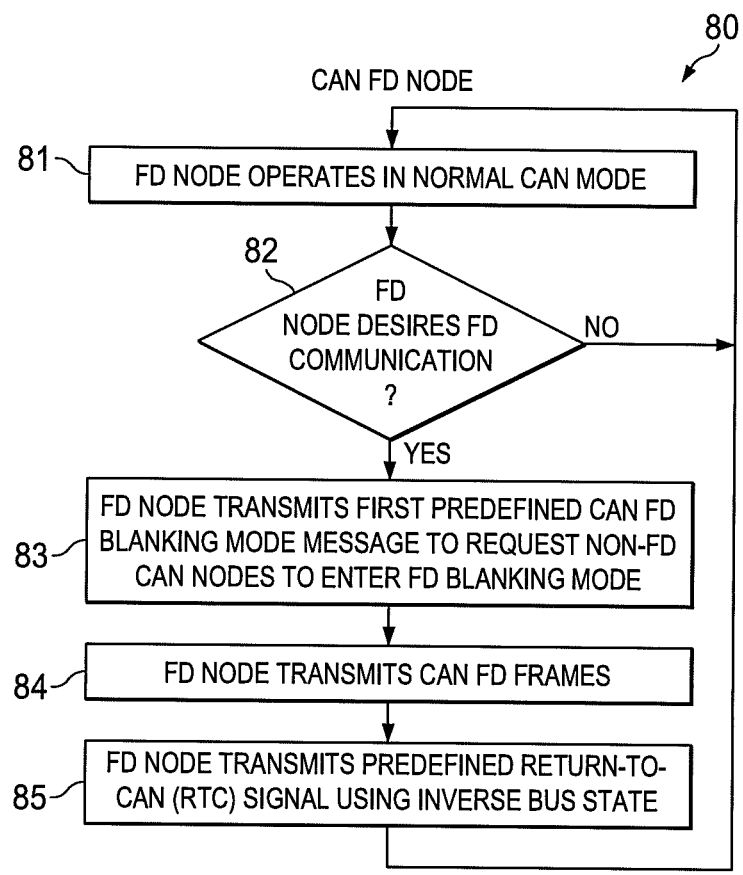
FIG. 13 is a flow diagram illustrating operation of the CAN FD nodes of FIGS. 6, 8 and 10 to selectively transmit CAN messages to request non-FD nodes to enter an FD blanking mode, and to transmit a return-to-CAN (RTC) signal or message using the inverted third bus state to request the non-FD nodes to return to the normal operating mode.

FIG. 13 illustrates a process 80 for CAN FD node operation, which may be implemented in the CAN FD node 24 examples of FIGS. 6, 8 and 10 in certain embodiments. Beginning with normal CAN mode operation at 81 FIG. 13, the CAN FD node 24 determines at 82 whether FD communication is desired. If not (NO at 82), the normal operation continues at 81. When the transmission of FD frames is desired (YES at 82), the CAN FD node transmits a first predefined message (referred to herein as an FD blanking mode message) at 83 in order to request the non-FD CAN node or nodes 22 to enter a second operating mode, referred to as "FD blanking mode" or "FD blocking mode". As with the above embodiments of FIGS. 1-5, any suitable first predefined message can be used at 83 to request the non-FD CAN nodes 22 to enter the FD blanking mode. Following transmission of the first predefined message at 83, the CAN FD node 24 transmits one or more FD frames at 84, and once the FD frame transmission is completed, transmits a predefined signal using the third (inverse) bus state 69 at 85 (referred to herein as a "return-to-CAN (RTC) signal).

Figure 12:
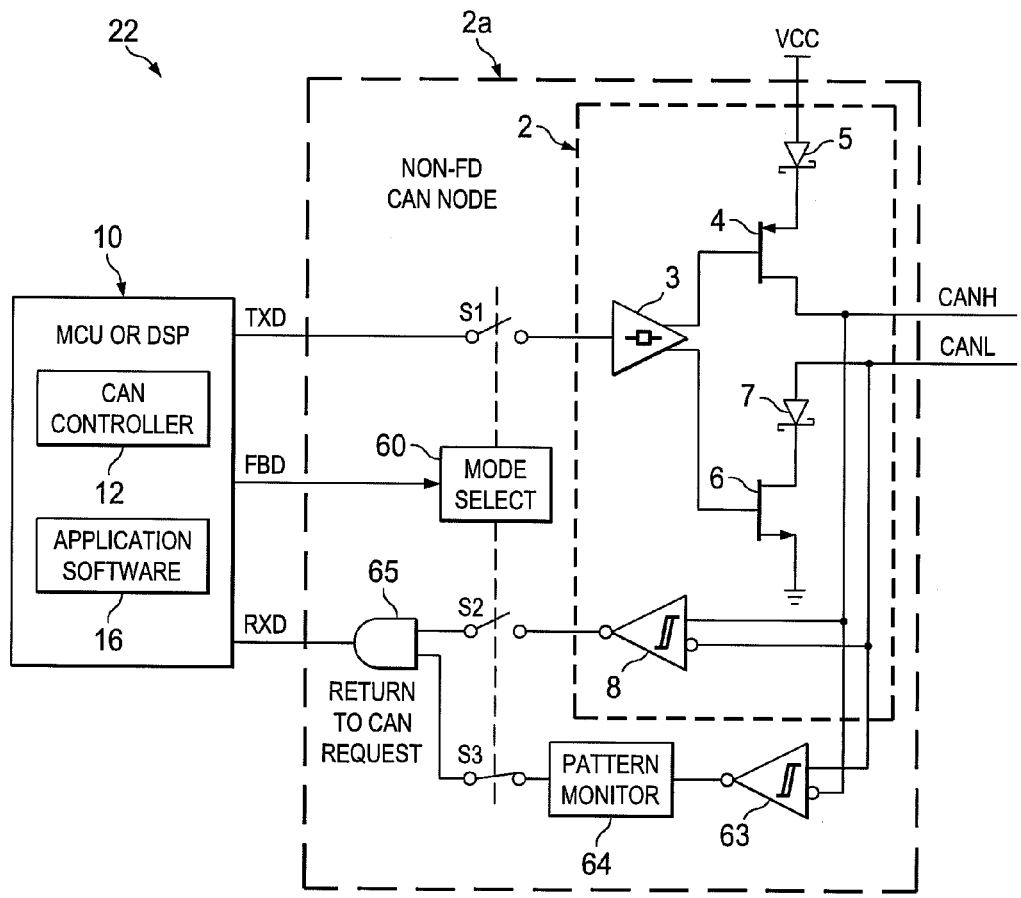
FIG. 12 is a schematic diagram illustrating an exemplary non-FD CAN node with a processor configured to set the node in a normal operating mode or a FD blocking mode, which includes auxiliary receiver circuitry configured to detect the inverted third CAN bus state to initiate transition of the non-FD CAN node from the FD blocking mode to the normal operating mode.

FIG. 12 illustrates an exemplary non-FD CAN node 22 which may be used in mixed networks 20 having CAN FD nodes 24 such as those illustrated in FIGS. 6, 8 and 10 in accordance with certain aspects of the present disclosure. As seen in FIG. 12, the non-FD CAN node apparatus 22 in this embodiment includes a transceiver 2 as described above in connection with FIG. 1, with a receiver circuit 8 operative to receive data of normal CAN frames by detecting the first and second bus states 67 and 68. In addition, the exemplary non-FD CAN node 22 in FIG. 12 includes an auxiliary receiver circuit 63, 64, 65 including a comparator circuit 63 with inputs connected in inverse fashion to the CAN bus network connections CANL and CANH. The auxiliary receiver circuitry in the node 22 is operative to receive and identify the predefined signal or a second predefined message by detecting the third bus state 69 (e.g., FIGS. 7, 9, 11) in which the inverse voltage between CANL and CANH is greater than the second non-zero threshold value. The mode control circuit 60 in the non-FD CAN node 22 is operable by the FDB signal from the processor 10 in response to receipt by the receiver 8 of the first predefined message from the CAN FD node 24 to disable the transmitter 3, and also to selectively enable the transmitter 3 in response to receipt by the auxiliary receiver circuitry 63-65 of the predefined signal or second predefined message from the CAN FD node 24.

Similar to the auxiliary receiver circuitry 63-65 and mode control circuit 60 described above in connection with FIGS. 6, 8 and 10, the circuitry 63-65 and switches S1-S3 allow the processor 10 in FIG. 12 to selectively operate the non-FD CAN node 22 in a normal mode with switches S1 and S2 closed and S3 opened, and in a second mode (FD blanking mode) in which S3 is closed and S1 and S2 are opened. In the normal mode, received messages are provided from the receiver comparator 8 of the transceiver 2 through the closed switch S2 and the gate 65 to the RXD pin of the processor 10. Also in this mode, the non-FD CAN node 22 can transmit data with the processor 2 providing the data via its TXD pin through the closed switch S1 to the transmitter 3 for transmitting the message to the bus lines CANL, CANH using the first and second bus states 67 and 68 described above.

Once a first predefined message is received in this fashion, the non-FD node processor 10 asserts the FDB signal to operate the mode select circuitry 60 to open S1 and S2, while closing S3. With the non-FD CAN node 22 in the FD blanking mode, the transmitter 3 is effectively disabled, since its input is no longer connected to the TXD pin of the processor 10. Moreover, the normal receiver circuit 8 does not provide an input to the processor RXD pin. Instead, the processor 10 in this configuration will only receive and respond to receipt by the auxiliary receiver circuitry 63-65 of a predefined signal or predefined second message, in this case using the third bus state 69 shown in FIGS. 7, 9, 11 above. In this regard, the auxiliary comparator circuit 63 has inputs connected in reverse fashion relative to the input connections to the normal receiver comparator circuit 8 as shown in FIG. 12 to facilitate recognition of the reverse dominant third bus state examples.

When the predefined (inverse) signal or second predefined message is received, this may be checked against a predefined pattern via an included pattern monitor circuit 64, with the output being provided through the closed switch S3 and the gate 65 to the RXD pin of the processor 10. In other possible implementations, the pattern monitor circuitry 64 may be omitted, with the output of the auxiliary receiver comparator 63 connected through S3 and gate 65 to the RXD pin of the processor 10 for recognition of a single instance or bit of the third bus state 69 (e.g., a reverse dominant signal). When the predefined signal is recognized by the non-FD node processor 10, the application software 16 thereof de-asserts the FDB signal causing the mode select circuit 60 to revert to the normal operation by closing S1 and S2 and opening S3, thus re-enabling the transmitter 3 of the transceiver circuit 2. As seen in FIG. 12, moreover, the auxiliary receiver circuitry, the mode control circuit 60 and switches S1-S3 may be provided in addition to a transceiver integrated circuit 2 in certain implementations. In various embodiments, moreover, the auxiliary receiver circuitry 63-65 and/or the mode select circuitry 60 and switches S1-S3 may be included with the transceiver circuit 2 in a single integrated circuit 2a as seen in FIG. 12.

Figure 14:
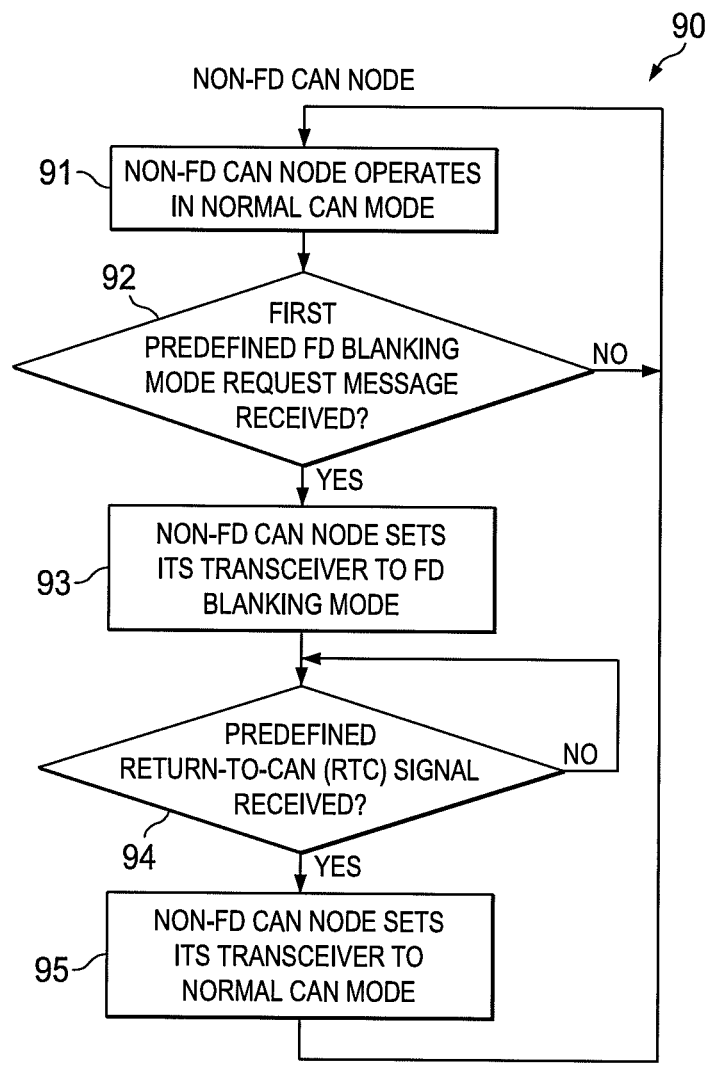
FIG. 14 is a flow diagram illustrating operation of the non-FD CAN node of FIG. 12 to switch from a normal operating mode to the FD blanking mode in response to receipt of an FD blanking mode request message, and to selectively return to the normal operating mode in response to receipt of an RTC signal or message.

FIG. 14 illustrates an exemplary method 90 for operating the non-FD CAN node 22 (e.g., of FIG. 12), in which normal CAN operation is provided at 91, with the non-FD CAN node 22 determining at 90 to whether a first predefined (e.g., FD blanking mode request) message has been received. If not (NO at 92), the normal operating mode continues at 91. Once the first predefined message has been received (YES at 92), the non-FD CAN node 22 sets its transceiver to the FD blanking mode at 93. In the illustrated example of FIG. 12, for example, the processor 10 of the non-FD node 22 asserts the FDB signal in order to operate the mode select circuitry 60 to open S1 and S2 and to close S3 in response to receipt of the first predefined message and 92. Thereafter, the non-FD CAN node awaits receipt of a predefined (RTC) signal at 94, and once received (YES at 94), sets its transceiver back to the normal CAN mode at 95 (e.g., using the mode select circuitry 60) and returns to normal processing at 91 as described above.

In the embodiments of FIGS. 6-14, the use of the mode select circuitry 60 and the switches S1-S3 in the non-FD CAN node or nodes 22 advantageously allows expeditious transition between the normal operating mode and the FD blanking mode, and in particular avoids or mitigates transition latency in returning to the normal CAN mode after receipt of the predefined signal or second message. In this regard, the embodiments of FIGS. 6-14 utilize additional transmit hardware on the CAN FD nodes 24 and on the non-FD CAN nodes 22, but mitigate or avoid transition latency and also avoid the potential extra processing to reset non-FD node error counters as described above in connection with FIGS. 1-5. In addition, the examples of FIGS. 6-14 can be implemented with minimal application software overhead.

Although illustrated and described above as using a predefined signal including the third bus state 69 to request the non-FD nodes 22 to return to normal CAN mode, other embodiments are possible in which the CAN FD node 24 sends a predefined second message, possibly including the third bus state 69 for the RTC request. In this case, the non-FD CAN nodes 22 may include the pattern monitor circuitry 64 to identify the predefined second message pattern and signal the processor 10 accordingly. The auxiliary receiver circuitry in the non-FD node 22 in certain embodiments may connect the inputs to the receiver comparator circuit 63 wired in reverse compared to the CANL and CANH connections to the normal receiver comparator 8, and the predefined signal or second predefined message can be a message recognizable by an included pattern monitor 64 such as the wake pattern from ISO11898-5, incorporated herein by reference in its entirety, except with an inverted (reverse polarity) differential signal using the third bus state 69.

These implementations are highly scalable since the non-FD CAN nodes 22 only need to receive the RTC signal or message and may not need to meet the full requirements of CAN or CAN FD communication, and the auxiliary transmit and receive circuitry may be designed in certain implementations to minimize cost and parasitic impact to the bus similar to the simplified receiver requirements defined for low power wake up in ISO11898-5. These embodiments are also efficient in terms of communications overhead, for example, utilizing only two or three CAN messages, which is significantly less overhead and latency than the approaches of FIGS. 1-5 above in which the CAN FD transmitter node 24 may send a significant number of CAN messages to clear the non-FD node error counters or to reduce the error count values below a threshold (e.g., 128) so as to return the non-FD CAN nodes 22 to an error active and bus on condition in transitioning from FD communications to non-FD communications. Moreover, the approaches of FIGS. 6-14 do not require specialized CAN wake up frame messaging and software control needed for partial networking with FD passive approaches proposed in ISO11898-6 with extensions.

Referring now to FIGS. 15-21, further embodiments are illustrated and described in which no application software or firmware upgrades to the non-FD nodes 22 are needed, with the non-FD CAN nodes 22 advantageously providing mode switching into and out of an FD blanking mode based on first and second predefined messages received from the transmitting CAN FD node 24. In this manner, no software or firmware updates are required in order to render the nodes 22 and 24 compatible for mixed network applications involving both CAN FD nodes 24 and non-FD CAN nodes 22 (e.g., mixed network 20 in FIG. 3 above).

Figure 15:
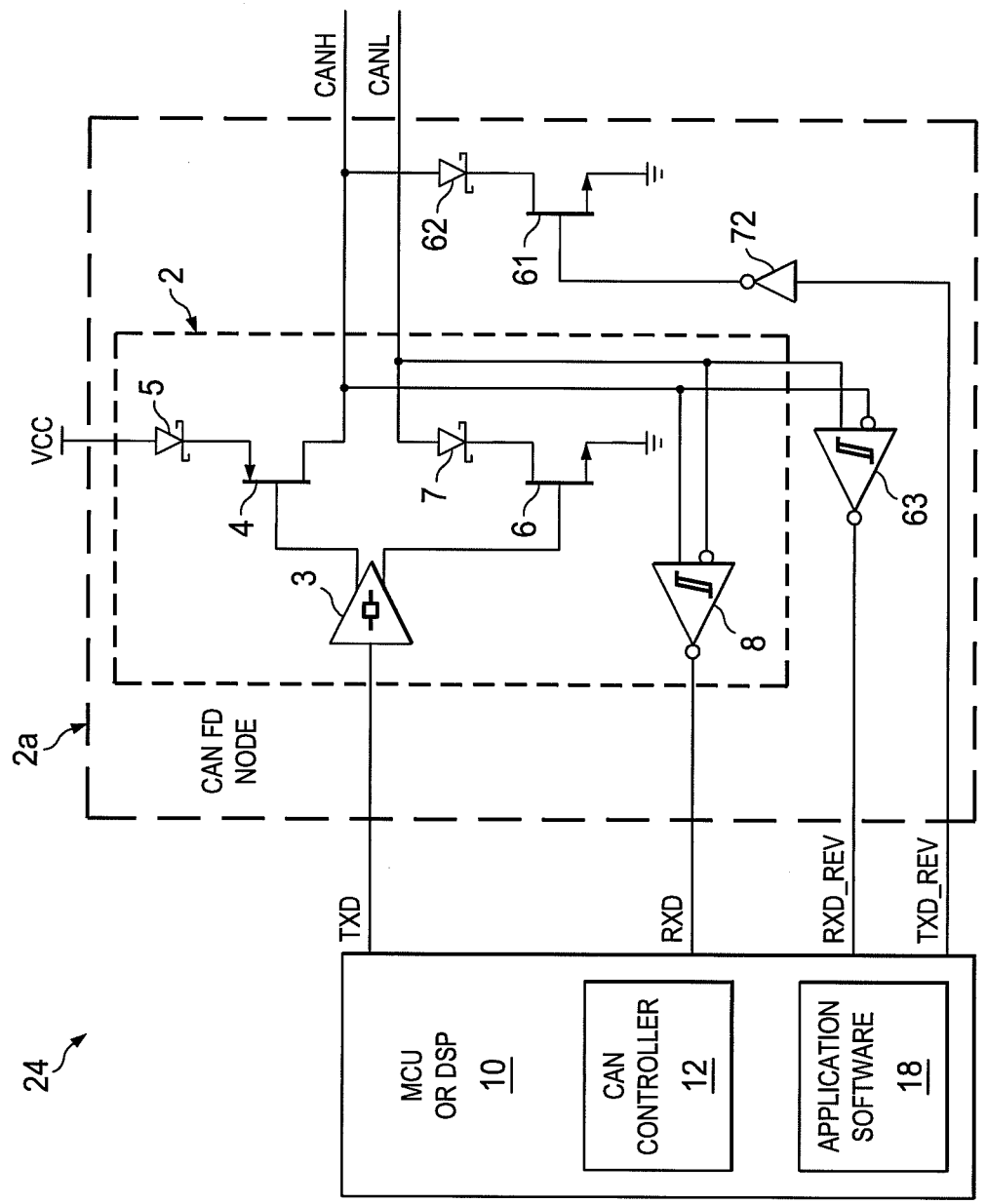
FIGS. 15-17 are schematic diagrams illustrating further CAN FD node embodiments with auxiliary transmit circuitry to selectively transmit a first predefined message including an inverted third bus state to request non-FD nodes to transition from a normal operating mode to an FD blocking mode, and to generate a second predefined message including the inverted third bus state for requesting the non-FD nodes to return to the normal operating mode.
Figure 16:
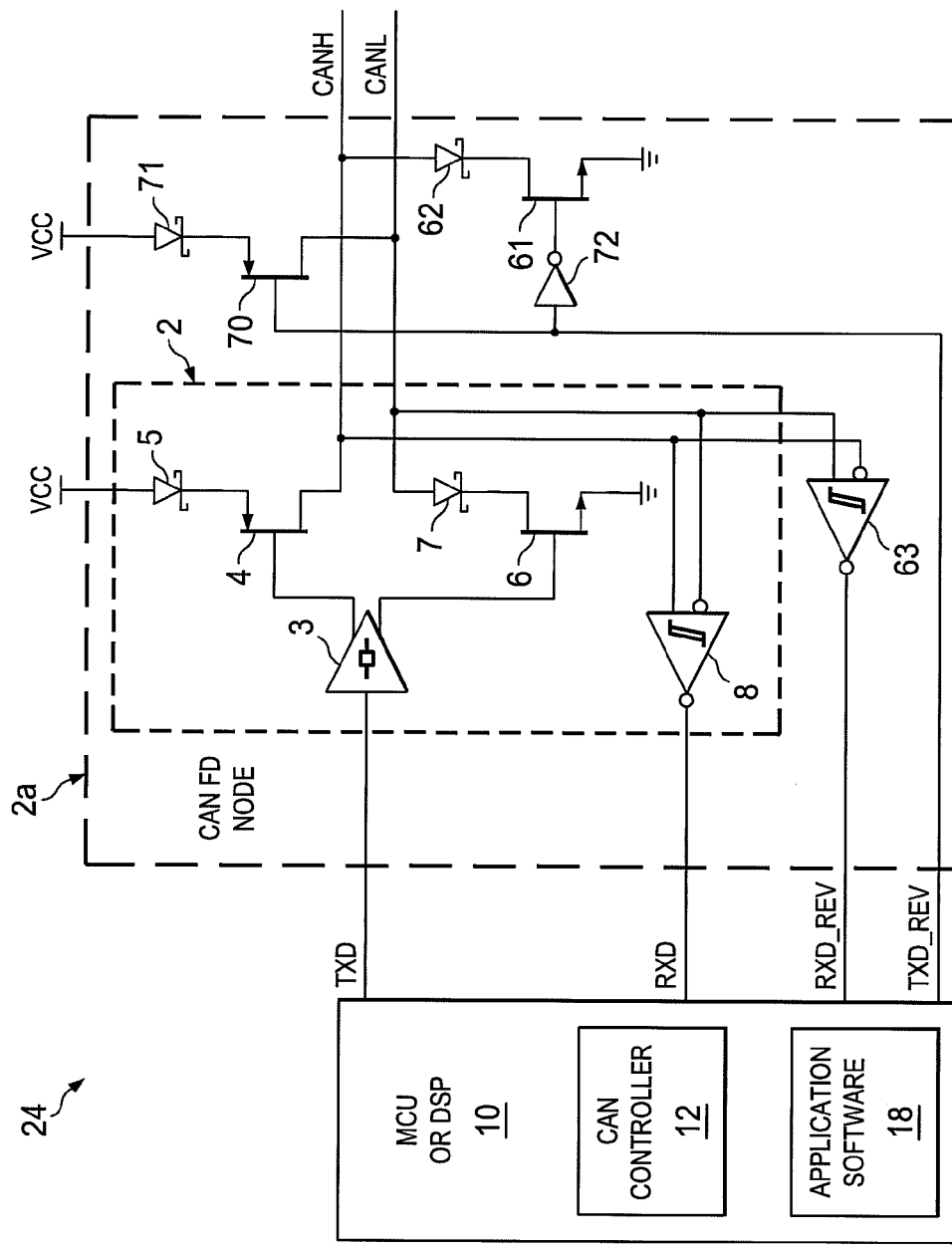
Figure 17:
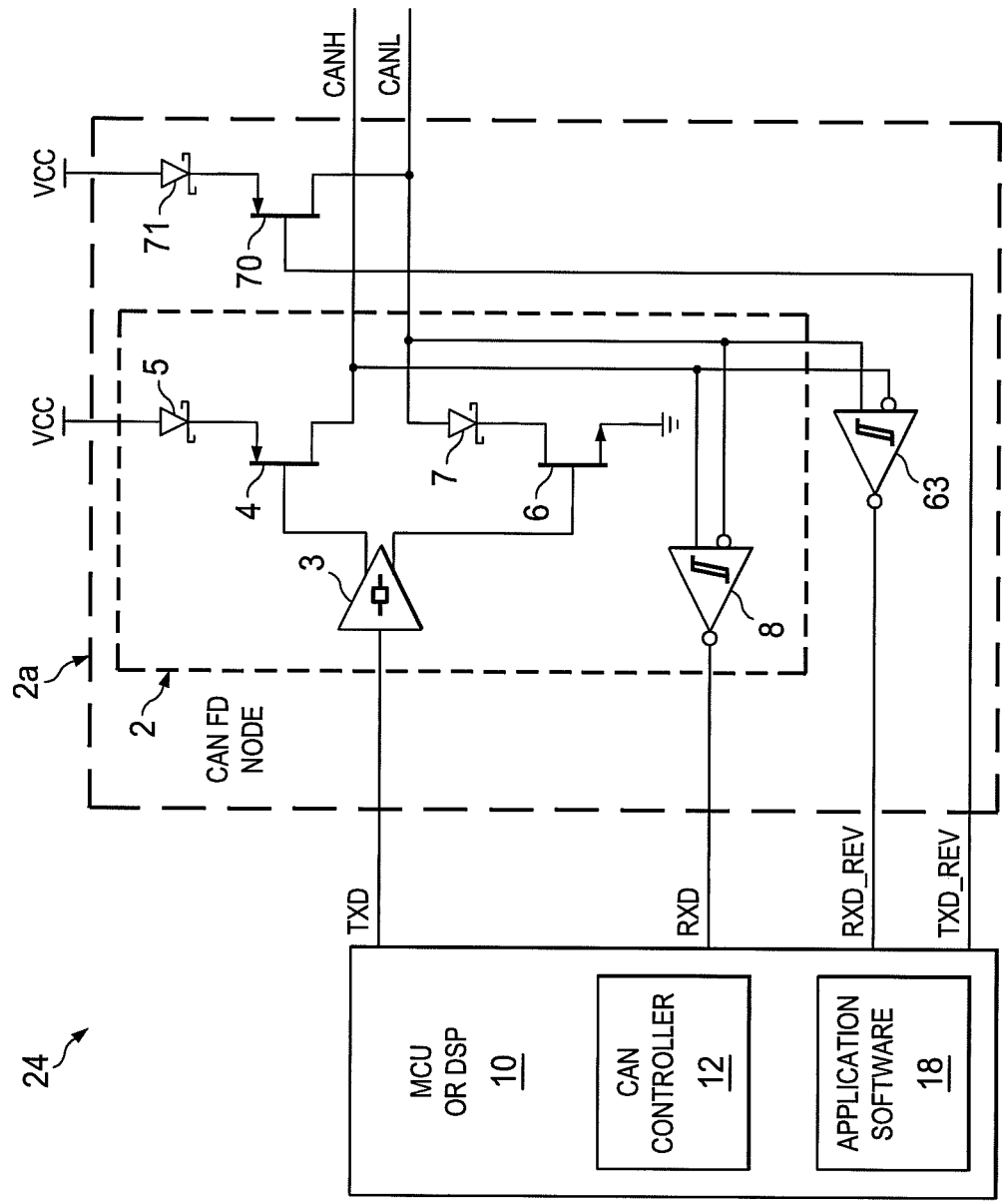

FIGS. 15-17 illustrate three non-limiting examples of CAN FD nodes 24 having transceivers 2 and processors 10 generally as described above, as well as auxiliary transmit circuitry 61, 62 in FIG. 15 allowing the processor 10 to generate a reverse polarity third bus state 69 by actuating a TXD_REV pin to drive transistor 61 through an inverter 72 thereby pulling the CANH bus line down to (or near) the circuit ground potential GND, wherein this implementation may be used to provide a third bus state 69 as illustrated in the graph 66 and FIG. 7 above. These examples may also include auxiliary receiver comparator circuitry 63 with inputs connected in reverse orientation compared with the normal transceiver receiver circuitry 8 as shown in FIGS. 15-17, and with the auxiliary receiver circuit 63 (if included) providing an output to an RXD_REV input to the processor

10. The example of FIG. 16 includes the transistor and Schottky diode 61 and 62 connected to the CANH line and driven by TXD_REV through an inverter 72, as well as a PMOS transistor 70 and Schottky diode 71 driving the transistor gate to selectively pull the CANL line up toward the positive supply voltage VCC while the NMOS transistor 61 with the inverter 72 pulls the CANH line down toward the circuit ground to generate a third bus state 69 generally as shown in the graph 73 of FIG. 9. FIG. 17 shows a third non-limiting example in which the PMOS transistor 70 and the Schottky diode 71 are provided to selectively pull the CANL bus line up toward VCC to provide the third bus state 69 generally as shown in FIG. 11 above under control of the processor 10 using the TXD_REV signal. As seen in FIGS. 15-17, moreover, the auxiliary transmit circuitry 61, 62, 70, 71, 72 may be provided in addition to an existing transceiver integrated circuit 2, or the transceiver and the auxiliary transmit circuitry (e.g., and possibly any included auxiliary receiver circuitry 63) may be integrated into a single integrated circuit 2a in certain embodiments.

Figure 18:
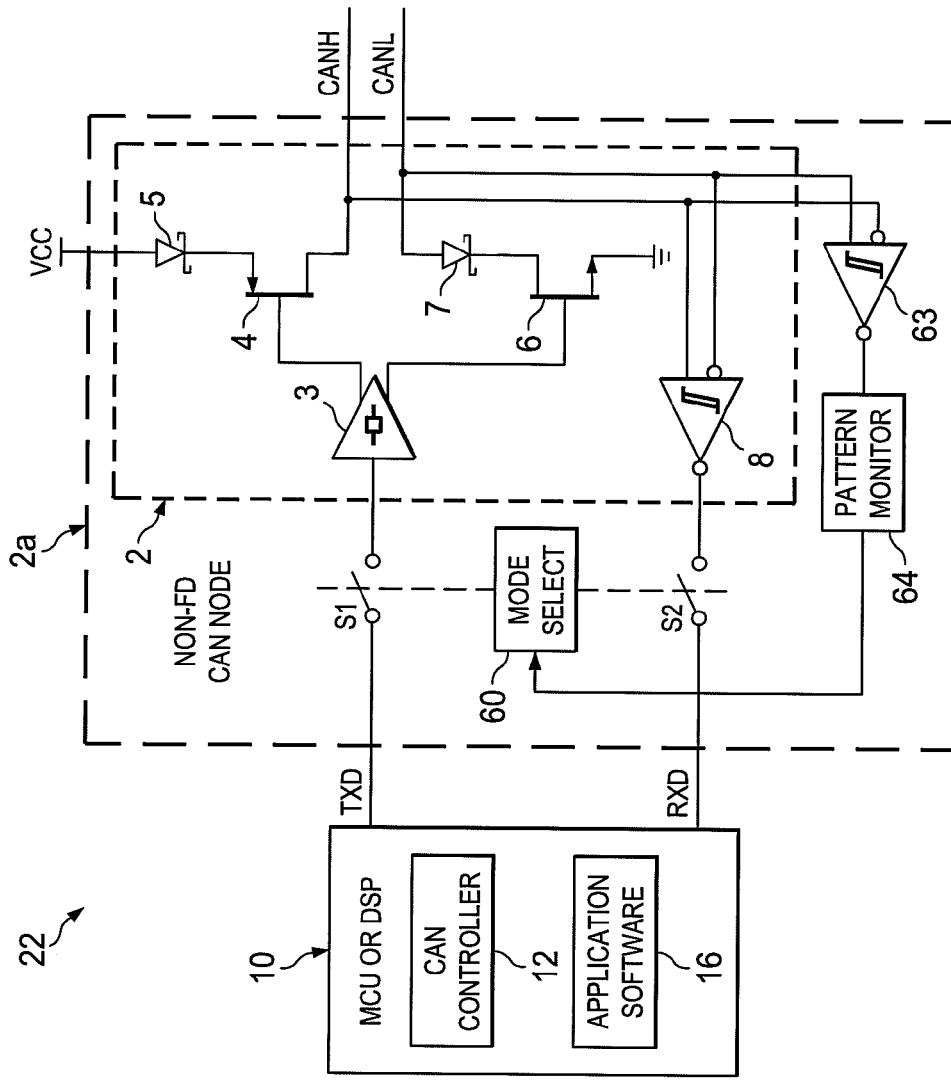
FIG. 18 is a schematic diagram illustrating another exemplary non-FD CAN node with auxiliary receiver circuitry to detect the inverted third CAN bus state to transition the node from an FD blocking mode to the normal operating mode.

FIG. 18 illustrates an exemplary non-FD CAN node 22 according to various embodiments, including a transceiver 2 as described above along with auxiliary receiver circuitry 63, 64, a mode select or control circuit 60, and controlled switches S1 and S2. Unlike the non-FD CAN node 22 of FIG. 12 above, the node 22 in FIG. 18 provides mode transition between a normal mode and an FD blanking mode via the mode control circuit 60. In this regard, the non-FD node processor 10 only needs the pre-existing TXD and RXD connections as seen in FIG. 18, and the auxiliary receiver circuitry 63, 64 and the mode control circuitry 60, S1, S2 may be connected to a pre-existing transceiver circuit 2, or this circuitry and the transceiver 2 may be integrated into a single integrated circuit package 2a in certain embodiments.

The auxiliary receiver comparator 63 in this example is connected in reverse fashion compared to the connections for the receiver circuit 8, and is thus capable of interpreting the third (inverse) bus state 69 as described above. The output of the auxiliary receiver comparator 63 is provided to a pattern monitor circuit 64 which controls operation of the mode select circuit 60. In particular, receipt of a first predefined message with a pattern recognized by the pattern monitor circuit 64 will cause the mode select circuit 60 to open the switches S1 and S2, thereby blanking subsequent FD frames from the non-FD node processor 10. Subsequent receipt of a second predefined message with another recognizable pattern causes the mode select circuit 60 to close the switches S1 and S2 and thereby resume normal CAN operation via the transceiver 2. In this manner, the application software 16 of the non-FD CAN node 22 needs no modification, and the operation of the auxiliary receiver circuitry 63, 64 and the mode select circuit 60 advantageously responds quickly to transitions from normal operation to FD blanking operation and back.

Figure 19:
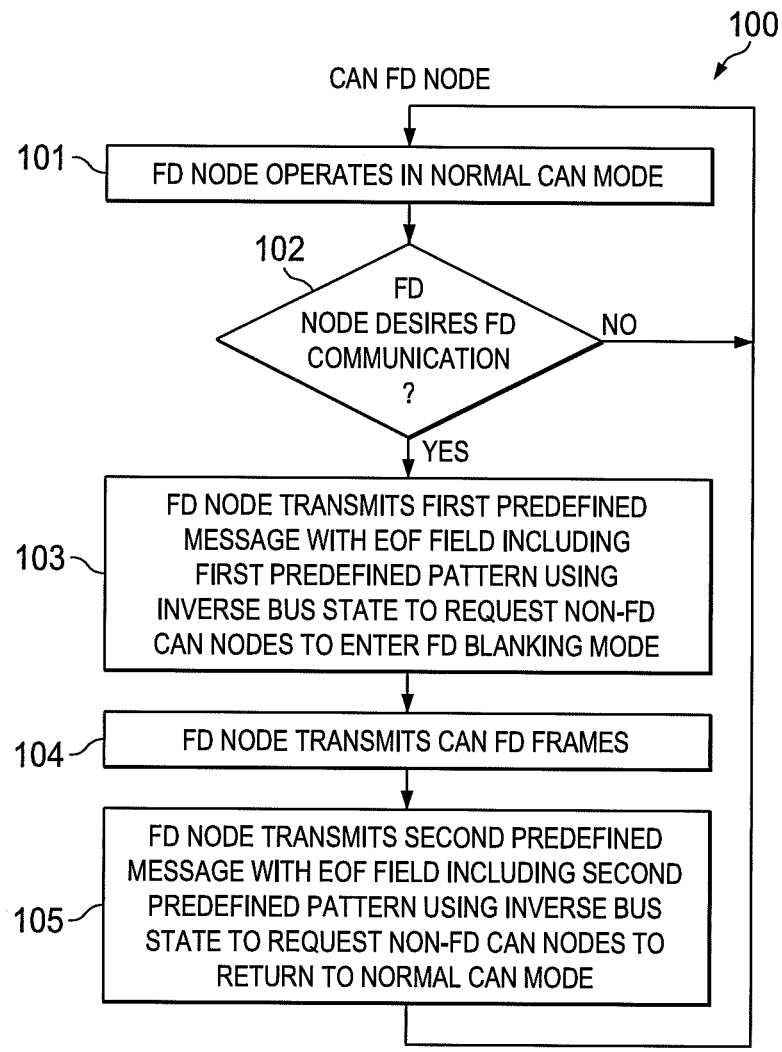
FIG. 19 is a flow diagram illustrating operation of the CAN FD nodes of FIGS. 15-17.

FIG. 19 illustrates an exemplary process 100 for operating the CAN FD nodes 24 of FIGS. 15-17, beginning with normal CAN mode operation at 101, with the node 24 determining at 102 whether FD communication is desired. If not (NO at 102), the normal CAN mode operation continues at 101. When FD communication is desired (YES at 102), the CAN FD node 24 transmits a first predefined message using the third bus state 69 to request the non-FD CAN nodes 22 to enter the FD blanking mode (e.g., to cause the mode select circuit 60 in FIG. 18 to open the switches S1 and S2). Thereafter at 104, the FD node 24 transmits one or more FD frames, after which the node 24 transmits a second predefined message to request the non-FD node 22 to return to the normal CAN mode operation, with the process 100 then returning to 101 as described above.

Figure 20:
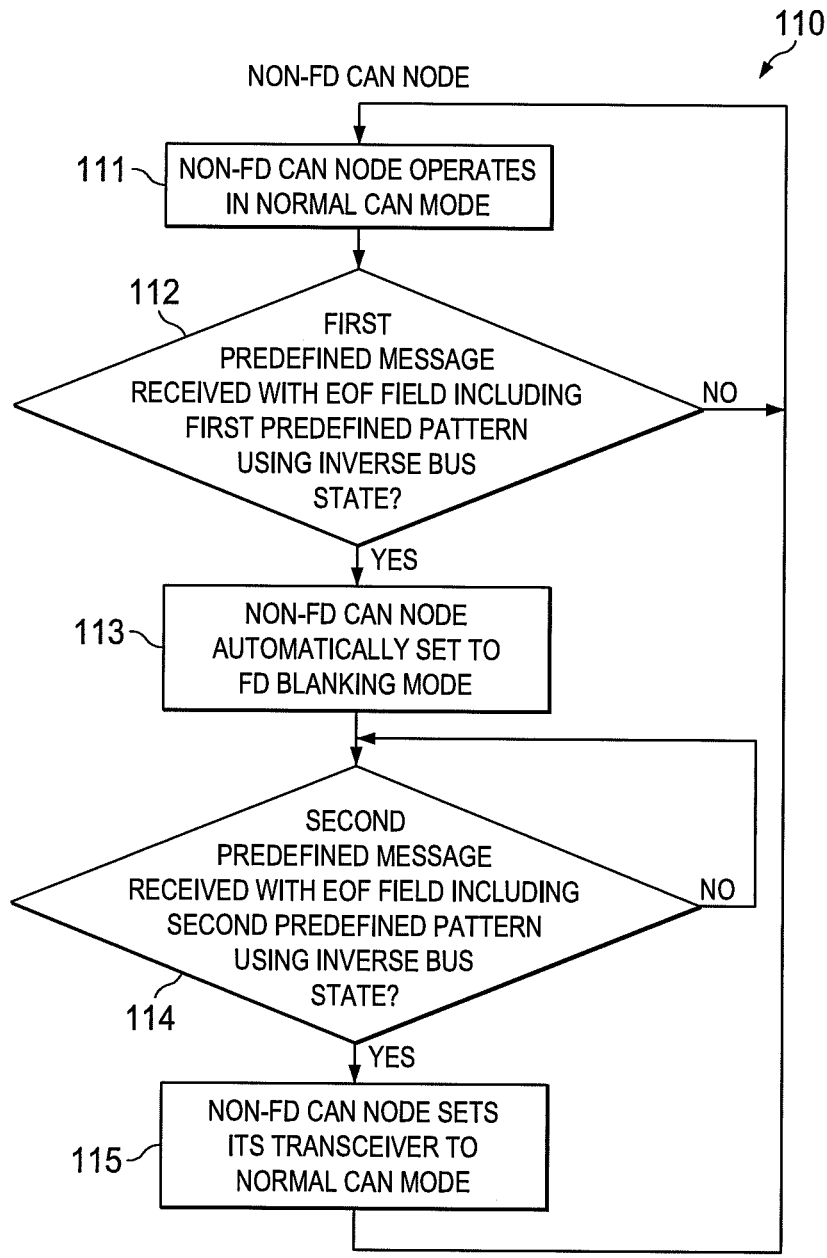
FIG. 20 is a flow diagram illustrating operation of the non-FD CAN node of FIG. 18 in a normal operating mode and an FD blanking mode.

FIG. 20 illustrates an exemplary process 110 for operating the non-FD CAN node 22 of FIG. 18. Beginning with normal CAN mode operation at 111, the non-FD node 22 determines at 112 whether a first predefined message has been received. If not (NO at 112), normal CAN mode operation continues at 111. Otherwise (YES at 112), the non-FD node 22 is set to the FD blanking mode (e.g., via operation of the pattern monitor circuit 64 recognizing the predefined first message and operating the mode select circuit 60 to open the switches S1 and S2 in FIG. 18). The non-FD node 22 (now in the FD blanking mode) determines at 114 whether a second predefined message has been received. If not (NO at 114), Blanking Mode continues. Otherwise (YES at 114) the transceiver 2 is returned to normal CAN operating mode at 115, and the process 110 returns to 111 as described above.

Figure 21:
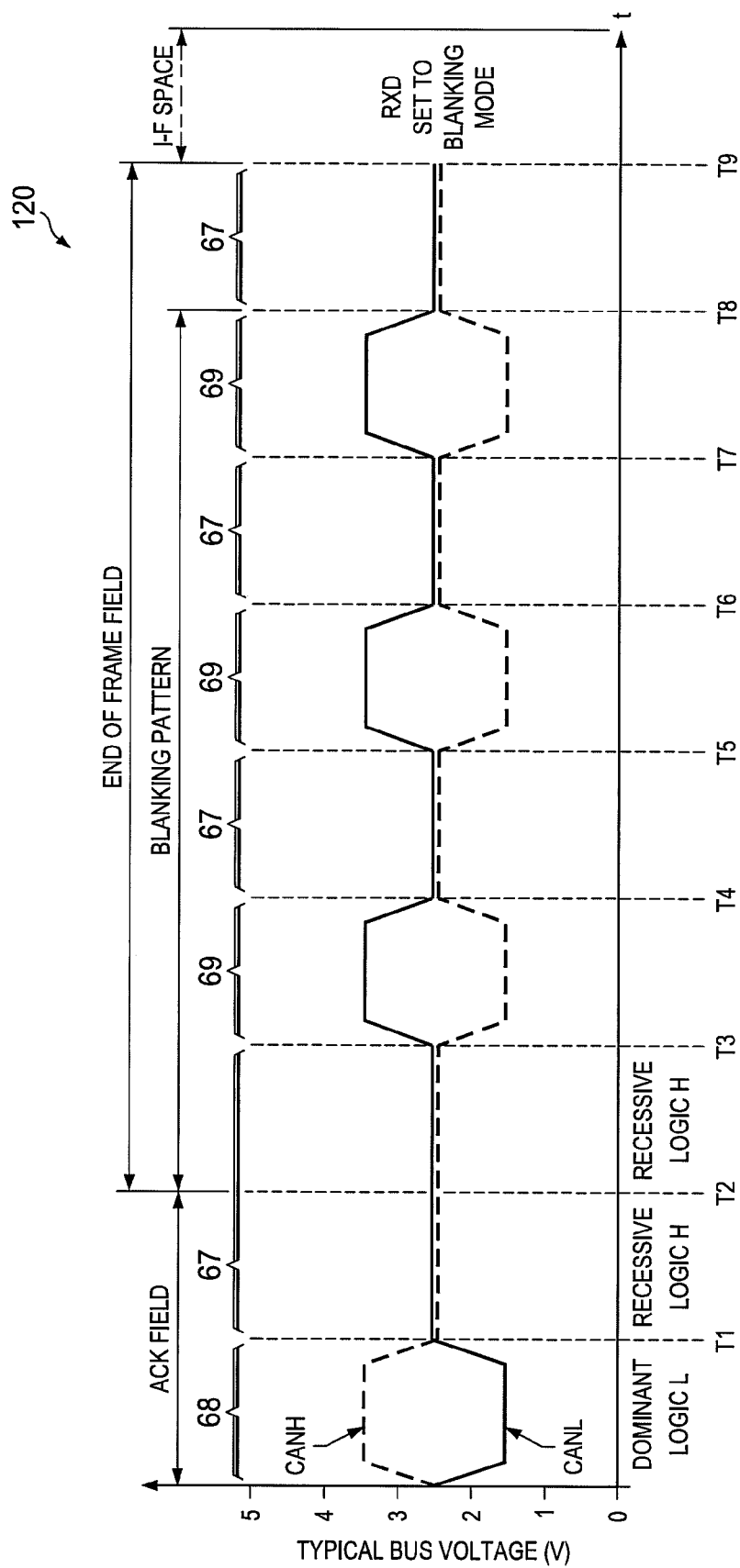
FIG. 21 is a waveform diagram illustrating an exemplary first predefined message transmitted by the CAN FD nodes of FIGS. 15-17 for requesting non-FD nodes to transition to the FD blocking mode.

FIG. 21 provides a graph 120 illustrating an exemplary first predefined message that may be transmitted by the CAN FD nodes 24 in the embodiments of FIGS. 15-17 to initiate FD blanking mode in the non-FD CAN node 22. As seen in the graph 120, the end of frame (EOF) field in this example includes a blanking pattern recognizable by the pattern monitor circuit 64 of the non-FD node 22, and includes the reverse dominant third bus state 69 in order to set the non-FD node 22 into the FD blanking mode. In the illustrated example, a recessive state 67 and the third bus state 69 are provided in the blanking pattern, wherein the illustrated example is but one specific implementation, and a variety of different embodiments are possible using any suitable predefined message to initiate FD blanking mode in the non-FD nodes 22. The example of FIG. 21 includes three cycles of an inverted dominant state 69 followed by a recessive first bus state 67. In certain embodiments, moreover, the CAN FD node 24 may utilize any included auxiliary receiver circuitry 63 (e.g., FIGS. 15-17) to monitor the bus during transmission of the first predefined message to ensure the blanking pattern was correctly provided to the bus prior to indicating to the application software 16 that the bus is safe for CAN FD message transmission. The first predefined message shown in the graph 120 is received in certain embodiments by the non-FD CAN node 22, which transitions to the FD blanking mode with the TXD an RXD pins of the non-FD processor 10 being disconnected. The auxiliary receiver circuit 63, and pattern monitor circuit 64 of the non-FD CAN node 22 thereafter awaits receipt of a predefined second message, again using the third bus state in these embodiments.

Figure 22:
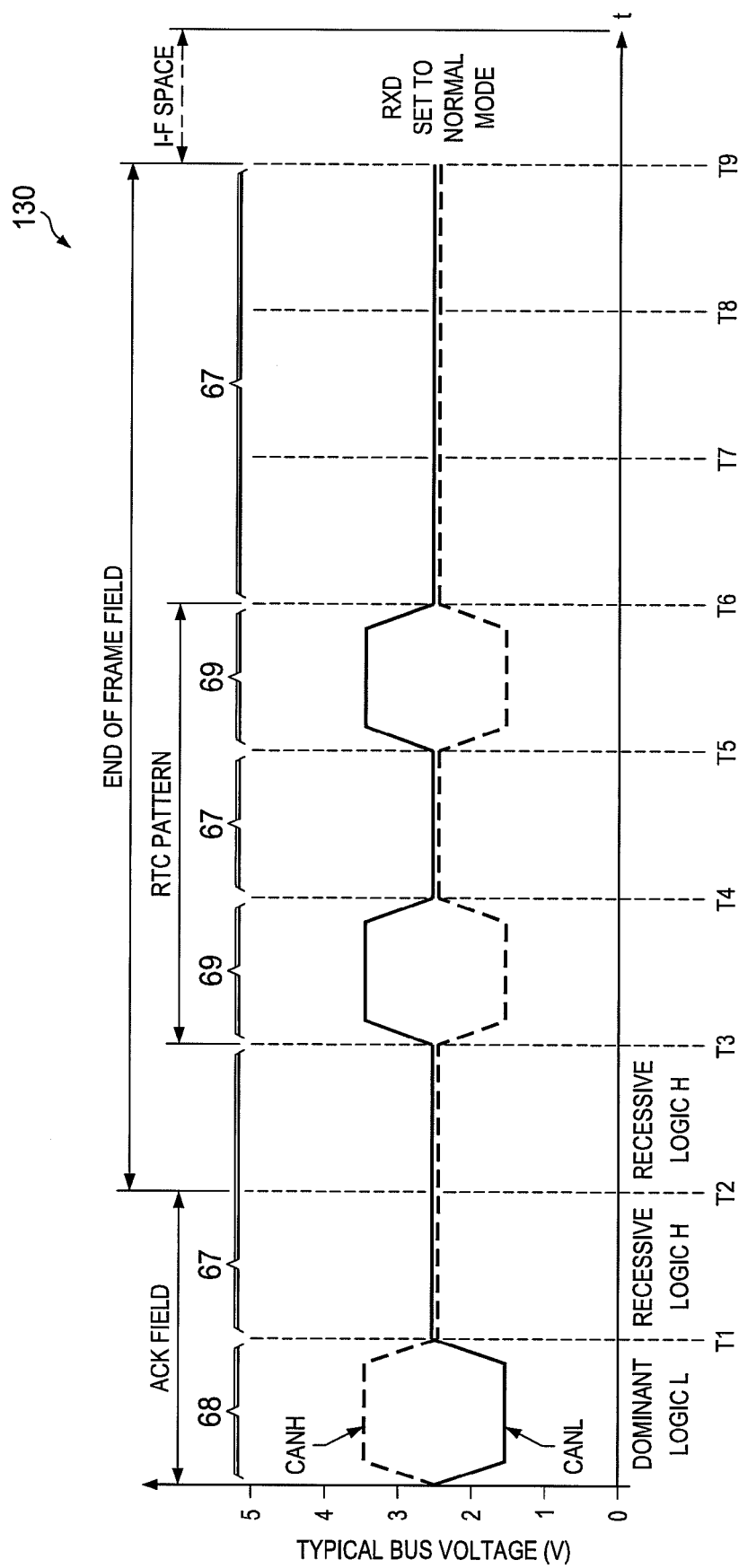
FIG. 22 is a waveform diagram illustrating an exemplary second predefined message transmitted by the CAN FD nodes of FIGS. 15-17 to request the non-FD nodes to transition from the FD blocking mode back to the normal operating mode.

FIG. 22 illustrates a graph 130 showing an exemplary second predefined (RTC) message in which a RTC pattern is included within the end of frame field, in this case including a pair of reverse dominant states 69 separated by a recessive state 67, where the first reverse dominant state 69 occurs in the second bit position of the end of frame field. Another non-limiting example would place the first reverse dominant state 69 in the third bit position of the end of frame field. In certain embodiments, receipt of this predefined second message by the non-FD node 22 switches the mode select circuit 60 back to normal operating mode with the switches S1 and S2 closed to resume normal CAN operation. These examples are merely non-limiting implementations, and a variety of different embodiments are possible using any suitable predefined messaging to return from FD blanking mode in the non-FD nodes 22

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A controller area network (CAN) flexible data rate (CAN FD) communications node, comprising:
a transceiver with first and second network connections and operative to transmit and receive non-FD CAN frames and CAN FD frames via a mixed CAN network operatively connecting CAN FD communications nodes and at least one non-FD CAN communications node; and
at least one processor coupled to the transceiver, and operative to transmit a CAN FD frame based on:
causing the transceiver to transmit a first predefined message or a first predefined signal over the mixed CAN network requesting the at least one non-FD CAN node to disable its transmitter,
causing the transceiver to transmit the CAN FD frame over the mixed CAN network after transmission of the first predefined message, and
after transmission of the CAN FD frame, causing the transceiver to transmit a second predefined message or to transmit a second predefined signal over the mixed CAN network requesting the at least one non-FD CAN node to enable its transmitter.

2. The CAN FD communications node of claim 1, wherein the at least one processor is configured, if a first threshold number of CAN FD frames were transmitted, to cause the transceiver to transmit a third predefined message to the CAN network requesting the at least one non-FD CAN node to reset its error counter prior to causing the transceiver to transmit the second predefined message.

3. The CAN FD communications node of claim 1, wherein the at least one processor is configured, if a first threshold number of CAN FD frames were transmitted, to cause the transceiver to transmit a sufficient number of additional non-FD CAN frames to the mixed CAN network to clear error counters of the at least one non-FD CAN node prior to causing the transceiver to transmit the second predefined message.

4. The CAN FD communications node of claim 1, wherein the transceiver transmits the first predefined message and the second predefined message using only two bus states recognized in normal CAN bus operation.

5. The CAN FD communications node of claim 1:
wherein the transceiver is operative to transmit and receive non-FD CAN frames and CAN FD frames using a first bus state in which the first and second network connections are not actively driven by the transceiver and a second bus state in which the transceiver controls a voltage of a first polarity between the first and second network connections to be greater than a first non-zero threshold value;
further comprising an auxiliary transmit circuit electrically coupled to at least one of the first and second network connections and operable by the at least one processor to selectively transmit the second predefined message or the predefined signal using a third bus state in which the auxiliary transmit circuit controls a voltage of a second opposite polarity between the first and second network connections to be greater than a second non-zero threshold value to request the at least one non-FD CAN node to enable its transmitter, the third bus state being distinguishable from the first and second bus states.

6. The CAN FD communications node of claim 5, wherein the at least one processor is configured to selectively cause the auxiliary transmit circuit to transmit the predefined signal to the mixed CAN network after transmission of the CAN FD frame to request the at least one non-FD CAN node to enable its transmitter.

7. The CAN FD communications node of claim 5, wherein the at least one processor is configured to selectively cause the auxiliary transmit circuit to transmit the second predefined message over the mixed CAN network after transmission of the CAN FD frame to request the at least one non-FD CAN node to enable its transmitter.

8. The CAN FD communications node of claim 7, wherein the at least one processor is configured to selectively cause the auxiliary transmit circuit to transmit the second predefined message including an end of frame field with a predefined pattern using the third bus state and at least one of the first and second bus states.

9. The CAN FD communications node of claim 8, wherein the at least one processor is configured to selectively cause the auxiliary transmit circuit to transmit the first predefined message including an end of frame field with a different predefined pattern using the third bus state and at least one of the first and second bus states.

10. The CAN FD communications node of claim 7, wherein the at least one processor is configured to selectively cause the auxiliary transmit circuit to transmit the first predefined message including an end of frame field with a predefined pattern using the third bus state and at least one of the first and second bus states.

11. The CAN FD communications node of claim 5, wherein the auxiliary transmit circuit and the transceiver are provided in a single integrated circuit.

12. A mixed controller area network (CAN) operatively connecting one or more flexible data rate (CAN FD) communication nodes and one or more non-flexible data rate (non-FD CAN) communications nodes, and operatively communicating CAN FD and non-FD CAN frames, each non-FD CAN communications node comprising:
a transceiver including a transmitter, a receiver, and first and second network connections, the transceiver operative to transmit and receive non-FD CAN frames;
the transceiver operative to receive data of the CAN frames by detecting a first bus state in which a voltage between the first and second network connections is below a first non-zero threshold value, and a second bus state in which a voltage of a first polarity between the first and second network connections is greater than the first non-zero threshold value;
at least one processor operatively connected to the transceiver and configured to:
selectively disable the transmitter in response to receipt of a first predefined message or a first predefined signal, and selectively enable the transmitter in response to receipt of a second predefined signal; and an auxiliary receiver circuit electrically coupled with the first and second network connections and operative to receive and identify the second predefined signal by detecting a third bus state in which the voltage of a second opposite polarity between the first and second network connections is greater than a second non-zero threshold value.

13. The mixed CAN network of claim 12, wherein the at least one processor is configured to:

selectively disable the transmitter by providing a mode control signal to a mode select input of the transceiver in a first state to place the transceiver into a silent mode in response to receipt of the first predefined message; and selectively enable the transmitter by providing the mode control signal to the mode select input of the transceiver in a second state to place the transceiver into a normal mode in response to receipt of the second predefined message.

14. The mixed CAN network of claim 12, each non-FD CAN communications node further comprising:

a mode control circuit operable by the at least one processor in response to receipt by the auxiliary receiver circuit of the predefined signal to selectively enable the transmitter.

15. The mixed CAN network of claim 14, wherein the mode control circuit is operable by the at least one processor in response to receipt by the receiver of the first predefined message to disable the transmitter.

16. The mixed CAN network of claim 14, wherein the auxiliary receiver circuit, the mode control circuit, and the transceiver are provided in a single integrated circuit.

17. A controller area network (CAN) non-flexible data rate (non-FD CAN) communications node, comprising:

a transceiver including a transmitter, a receiver, and first and second network connections, the transceiver operative to transmit and receive non-FD CAN frames via a mixed CAN network operatively connecting non-FD CAN and CAN FD communications nodes, the transceiver operative to receive data of the non-FD CAN frames by detecting a first bus state in which a voltage between the first and second network connections is below a first non-zero threshold value, and a second bus state in which a voltage of a first polarity between the first and second network connections is greater than the first non-zero threshold value;

at least one processor operatively connected to the transceiver;

an auxiliary receiver circuit electrically coupled with the first and second network connections and operative to detect at least one of the first and second bus states and a third bus state in which the voltage of a second opposite polarity between the first and second network connections is greater than a second non-zero threshold value; and a mode control circuit operatively coupled with the transceiver, the auxiliary receiver circuit, and the at least one processor and operative to:

disable the transmitter in response to receipt by the auxiliary receiver circuit of a first predefined message, and enable the transmitter in response to receipt by the auxiliary receiver circuit of a second predefined message.

18. The non-FD CAN communications node of claim 17, wherein the auxiliary receiver circuit comprises:

a comparator with inputs electrically coupled with the first and second network connections and an output having a first state indicating detection of the at least one of the first and second bus states and a second state indicating detection of the third bus state; and a pattern monitor circuit receiving the output of the comparator and comparing received messages with a first predefined pattern corresponding to the first predefined message and a second predefined pattern corresponding to the second predefined message, the pattern monitor circuit providing a control signal to the mode control circuit to indicate receipt of the first predefined message or receipt of the second predefined message.

19. The non-FD CAN communications node of claim 18, wherein the mode control circuit comprises:

a first switch connected between a transmit pin of the at least one processor and the transmitter of the transceiver;

a second switch connected between a receive pin of the at least one processor and the receiver of the transceiver; and a mode select control circuit with an input receiving the control signal from the pattern monitor circuit, and providing switching control signals to the first and second switches to open the first and second switches in response to receipt by the auxiliary receiver circuit of the first predefined message, and to close first and second switches in response to receipt by the auxiliary receiver circuit of the second predefined message.

20. The non-FD CAN communications node of claim 17, wherein the transceiver, the auxiliary receiver circuit, and the mode control circuit are provided in a single integrated circuit.

* * * * *